US011909151B2

(12) United States Patent
Endo et al.

(10) Patent No.: US 11,909,151 B2
(45) Date of Patent: Feb. 20, 2024

(54) ELECTRICAL CONNECTOR WHICH CAN PREVENT DEFORMATION OF CORE WIRE OF COAXIAL CABLE CAUSED BY APPLIED PRESSURE ONTO THE COAXIAL CABLE AT TIME OF CRIMPING OUTER CONTACT ONTO THE COAXIAL CABLE

(71) Applicant: MITSUMI ELECTRIC CO., LTD., Tama (JP)

(72) Inventors: Kazuma Endo, Tama (JP); Hiroyuki Sadohara, Tama (JP); Takahiro Kanda, Tama (JP)

(73) Assignee: MITSUMI ELECTRIC CO., LTD., Tama (JP)

( * ) Notice: Subject to any disclaimer, the term of this patent is extended or adjusted under 35 U.S.C. 154(b) by 61 days.

(21) Appl. No.: 17/653,807

(22) Filed: Mar. 7, 2022

(65) Prior Publication Data

US 2022/0311151 A1 Sep. 29, 2022

(30) Foreign Application Priority Data

Mar. 29, 2021 (JP) .................................. 2021-56182

(51) Int. Cl.
*H01R 4/18* (2006.01)
*H01R 24/40* (2011.01)

(52) U.S. Cl.
CPC ............ *H01R 4/185* (2013.01); *H01R 24/40* (2013.01)

(58) Field of Classification Search
CPC ................................ H01R 4/185; H01R 24/40
USPC .......................................................... 439/578
See application file for complete search history.

(56) References Cited

U.S. PATENT DOCUMENTS

| | | | | |
|---|---|---|---|---|
| 8,366,483 B2* | 2/2013 | Hardy | H01R 9/0518 439/585 |
| 9,991,650 B2* | 6/2018 | Lane | H01R 24/40 |
| 2016/0134032 A1 | 5/2016 | Hall et al. | |
| 2017/0214191 A1* | 7/2017 | Lane | H01R 13/426 |
| 2017/0271807 A1* | 9/2017 | Lane | H01R 13/506 |

FOREIGN PATENT DOCUMENTS

| | | | |
|---|---|---|---|
| DE | 102012201565 A1 * | 8/2012 | H01R 13/5804 |
| EP | 0027680 A1 | 4/1981 | |
| EP | 1519454 A1 | 3/2005 | |

(Continued)

OTHER PUBLICATIONS

European Patent Office, Extended European Search Report Issued in Application No. 22157342.1, dated Jul. 20, 2022, Germany, 8 pages.

(Continued)

*Primary Examiner* — Peter G Leigh
(74) *Attorney, Agent, or Firm* — McCoy Russell LLP

(57) ABSTRACT

An electrical connector includes a contact pin to be connected to a core wire of a coaxial cable, an insulating housing for holding the contact pin therein, a cylindrical outer contact covering the housing and a crimping member for attaching the outer contact to the coaxial cable. A base end portion of the outer contact is located between an inner insulator layer and an outer conductor layer of the coaxial cable. The outer contact is attached to the coaxial cable by crimping the crimping member onto the outer conductor layer of the coaxial cable located on the base end portion of the outer contact.

13 Claims, 33 Drawing Sheets

(56) References Cited

FOREIGN PATENT DOCUMENTS

| | | | | |
|---|---|---|---|---|
| JP | 2017534154 A | | 11/2017 | |
| JP | 6688903 B2 | * | 4/2020 | ........... H01R 13/426 |

OTHER PUBLICATIONS

European Patent Office, Office Action Issued in Application No. 22157342.1, dated May 26, 2023, Netherlands, 3 pages.

European Patent Office, Office Action Issued in Application No. 22157342.1, dated Sep. 7, 2023, Netherlands, 6 pages.

* cited by examiner

ELECTRICAL CONNECTOR WHICH CAN PREVENT DEFORMATION OF CORE WIRE OF COAXIAL CABLE CAUSED BY APPLIED PRESSURE ONTO THE COAXIAL CABLE AT TIME OF CRIMPING OUTER CONTACT ONTO THE COAXIAL CABLE

CROSS-REFERENCE TO RELATED APPLICATION

The present application claims priority to Japanese Patent Application No. 2021-056182 filed on Mar. 29, 2021. The entire contents of the above-listed application are hereby incorporated by reference for all purposes.

TECHNICAL FIELD

The present disclosure generally relates to electrical connectors, in particular to an electrical connector used for providing a coaxial connection with a coaxial cable.

BACKGROUND

In order to provide an electrical connection between an electronic device and another electronic device through a cable, a combination of a receptacle connector and a plug connector has been widely used. Further, an amount of data transmitted from the electronic device to the other electronic device through the cable has increased as processing capacity of the electronic devices has been improved in recent years. In order to transmit a large amount of data in a short time, it is necessary to transmit a high-frequency signal through the cable. Thus, there are needs of improving signal transmission characteristics of the cable, in particular, signal transmission characteristics of the cable in a high-frequency band. In order to address such needs, a coaxial cable having high signal transmission characteristics in the high frequency band has been widely used. As is well known, the coaxial cable has a coaxial structure in which a core wire for transmitting a signal, an inner insulator layer covering the core wire from the outside, an outer conductor layer (a braid layer) covering the inner insulator layer from the outside and an outer insulator layer (a sheath) covering the outer conductor layer from the outside are concentrically arranged.

In order to provide a coaxial connection with the above-mentioned coaxial cable, there has been widely used an electrical connector including a contact pin which should be electrically connected to the core wire of the coaxial cable, an insulating housing covering the contact pin and an outer contact which covers the housing and should be electrically connected to the outer conductor layer of the coaxial cable (for example, see patent document 1). FIG. 1 illustrates a typically used coaxial cable 500 and an outer contact 600 of an electrical connector which should be attached to the coaxial cable 500. As shown in FIG. 1, the coaxial cable 500 includes a core wire (an inner conductor) 510, an inner insulator layer 520 covering the core wire 510, an outer conductor layer (a braided layer) 530 covering the inner insulator layer 520 and an outer insulator layer 540 covering the outer conductor layer 530.

The outer contact 600 includes a cylindrical portion 610, a first crimping portion 620 and a second crimping portion 630. The first crimping portion 620 is a portion which should be crimped onto an outer peripheral surface of the outer conductor layer 530 of the coaxial cable 500. On the other hand, the second crimping portion 630 is a portion which should be crimped onto an outer peripheral surface of the outer insulator layer 540 of the coaxial cable 500. It has been commonly practiced to crimp the first crimping portion 620 onto the outer conductor layer 530 of the coaxial cable 500 and crimp the second crimping portion 630 onto the outer insulator layer 540 of the coaxial cable 500 by using a suitable tool such as crimp pliers for attaching the outer contact 600 to the coaxial cable 500.

However, when a strong pressure is applied to the coaxial cable 500 for crimping the first crimping portion 620 onto the outer conductor layer 530 of the coaxial cable 500, the core wire 510 of the coaxial cable 500 is crushed and deformed by the pressure. Thus, there is a problem that such deformation of the core wire 510 of the coaxial cable 500 leads to deterioration of signal transmission characteristics of the coaxial cable 500, in particular, deterioration of signal transmission characteristics of the coaxial cable 500 in the high frequency band.

RELATED ART DOCUMENT

Patent Document

[Patent Document 1] JP 2017-534154A

SUMMARY

Problem to be Solved by the Disclosure

The present disclosure has been made in view of the above-described problem of the conventional art. Accordingly, it is an object of the present disclosure to provide an electrical connector which can prevent the deformation of the core wire of the coaxial cable caused by the pressure applied to the coaxial cable at the time of crimping the outer contact onto the coaxial cable, thereby preventing the deterioration of the signal transmission characteristics of the coaxial cable.

Means for Solving the Problem

The above object is achieved by the present disclosures defined in the following (1) to (7).

(1) An electrical connector to be coupled with a coaxial cable including a core wire, an inner insulator layer covering the core wire, an outer conductor layer covering the inner insulator layer and an outer insulator layer covering the outer conductor layer, the electrical connector comprising:

- a contact pin to be connected to the core wire of the coaxial cable;
- an insulating housing for holding the contact pin therein;
- a cylindrical outer contact for covering the insulating housing; and
- a crimping member for attaching the outer contact to the coaxial cable,
- wherein a base end portion of the outer contact is located between the inner insulator layer and the outer conductor layer of the coaxial cable, and
- wherein the outer contact is attached to the coaxial cable by crimping the crimping member onto the outer conductor layer of the coaxial cable located on the base end portion of the outer contact.

(2) The electrical connector according to the above (1), wherein the crimping member is crimped onto the outer conductor layer of the coaxial cable so as to surround the outer conductor layer of the coaxial cable, and wherein the outer conductor layer of the coaxial cable is clamped between the crimping member and the outer contact, thereby attaching the outer contact to the coaxial cable.

(3) The electrical connector according to the above (1) or (2), wherein the crimping member includes a first crimping portion to be crimped onto the outer conductor layer of the coaxial cable so as to surround an outer peripheral surface of the outer conductor layer of the coaxial cable.

(4) The electrical connector according to the above (3), wherein the first crimping portion of the crimping member includes:

a pair of plate-like portions closed by connecting one end portions of the pair of plate-like portions to each other so as to surround the outer conductor layer of the coaxial cable, an engagement concave portion formed on one of the pair of plate-like portions, and an engagement convex portion formed on another one of the pair of plate-like portions, and wherein the engagement concave portion formed on the one of the pair of plate-like portions is engaged with the engagement convex portion formed on the other one of the pair of plate-like portions to prevent the pair of plate-like portions from being opened.

(5) The electrical connector according to the above (3) or (4), wherein the crimping member includes a second crimping portion to be crimped onto the outer insulator layer of the coaxial cable so as to surround an outer peripheral surface of the outer insulator layer of the coaxial cable, and wherein the first crimping portion and the second crimping portion of the crimping member are connected to each other.

(6) The electrical connector according to any one of the above (1) to (5), further comprising an insulating ring member located between the base end portion of the outer contact and the inner insulator layer of the coaxial cable.

(7) The electrical connector according to the above (6), wherein the insulating housing has a cylindrical shape, and wherein the insulating housing and the ring member are concentrically held in the outer contact.

Effect of the Disclosure

According to the electrical connector of the present disclosure, the outer contact is attached to the coaxial cable by crimping the crimping member onto the outer conductor layer of the coaxial cable located on the base end portion of the outer contact. With this configuration, a pressure applied at the time of crimping the crimping member onto the outer conductor layer of the coaxial cable is not transmitted to the core of the coaxial cable. As a result, it is possible to prevent deformation of the core wire of the coaxial cable caused by the pressure at the time of crimping the crimping member onto the coaxial cable, thereby preventing deterioration of signal transmission characteristics of the coaxial cable.

BRIEF DESCRIPTION OF THE FIGURES

In FIG. 31, a portion of the case positioned more to the tip side than a B-B line shown in FIG. 30 is omitted.

DETAILED DESCRIPTION

Figure 1:
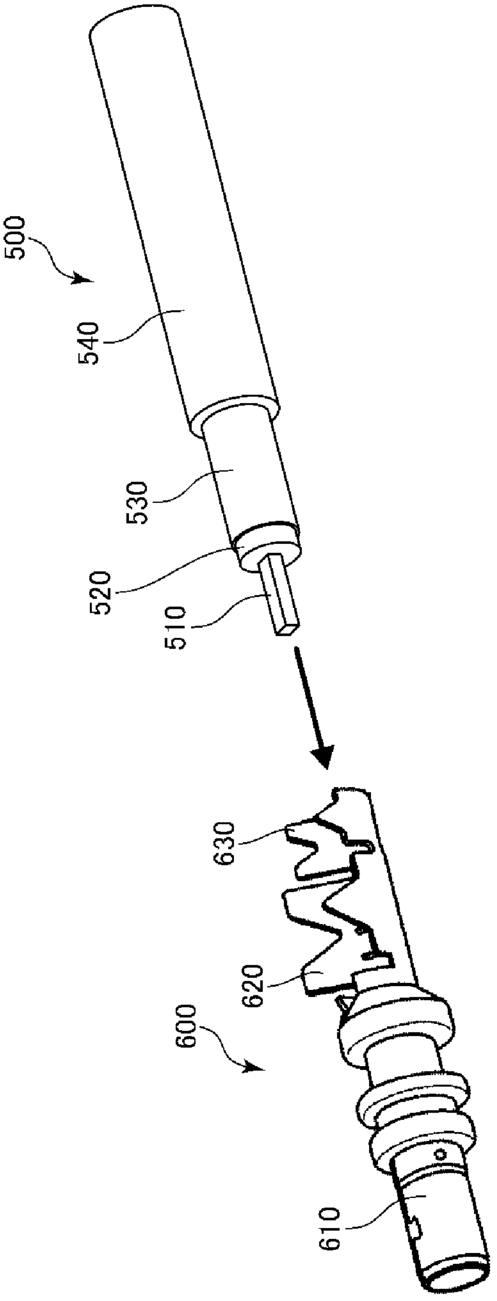
Prior art Fig. 1
FIG. 1 is a perspective view showing an outer contact of a conventional electrical connector and a coaxial cable.

Hereinafter, an electrical connector of the present disclosure will be described with reference to some embodiments shown in the accompanying drawings. Note that each of the figures referred in the following description is a schematic diagram prepared for explaining the present disclosure. A dimension (such as a length, a width and a thickness) of each component shown in the drawings is not necessarily identical to an actual dimension. Further, the same reference numbers are used throughout the drawings to refer to the same or similar elements. In the following description, the positive direction of the Z-axis in each figure may be referred to as “a tip side” or “a front side”, the negative direction of the Z-axis in each figure may be referred to as “a base side” or “a rear side”, the positive direction of the Y-axis in each figure may be referred to as “an upper side”, the negative direction of the Y-axis in each figure may be referred to as “a lower side”, the positive direction of the X-axis in each figure may be referred to as “a near side” and the negative direction of the X-axis in each figure may be referred to as “a far side”. Further, the Z direction may be referred to as “an insertion and extraction direction of the electrical connector”, the Y direction may be referred to as “a height direction” and the X direction may be referred to as “a width direction”.

First Embodiment

Figure 2:
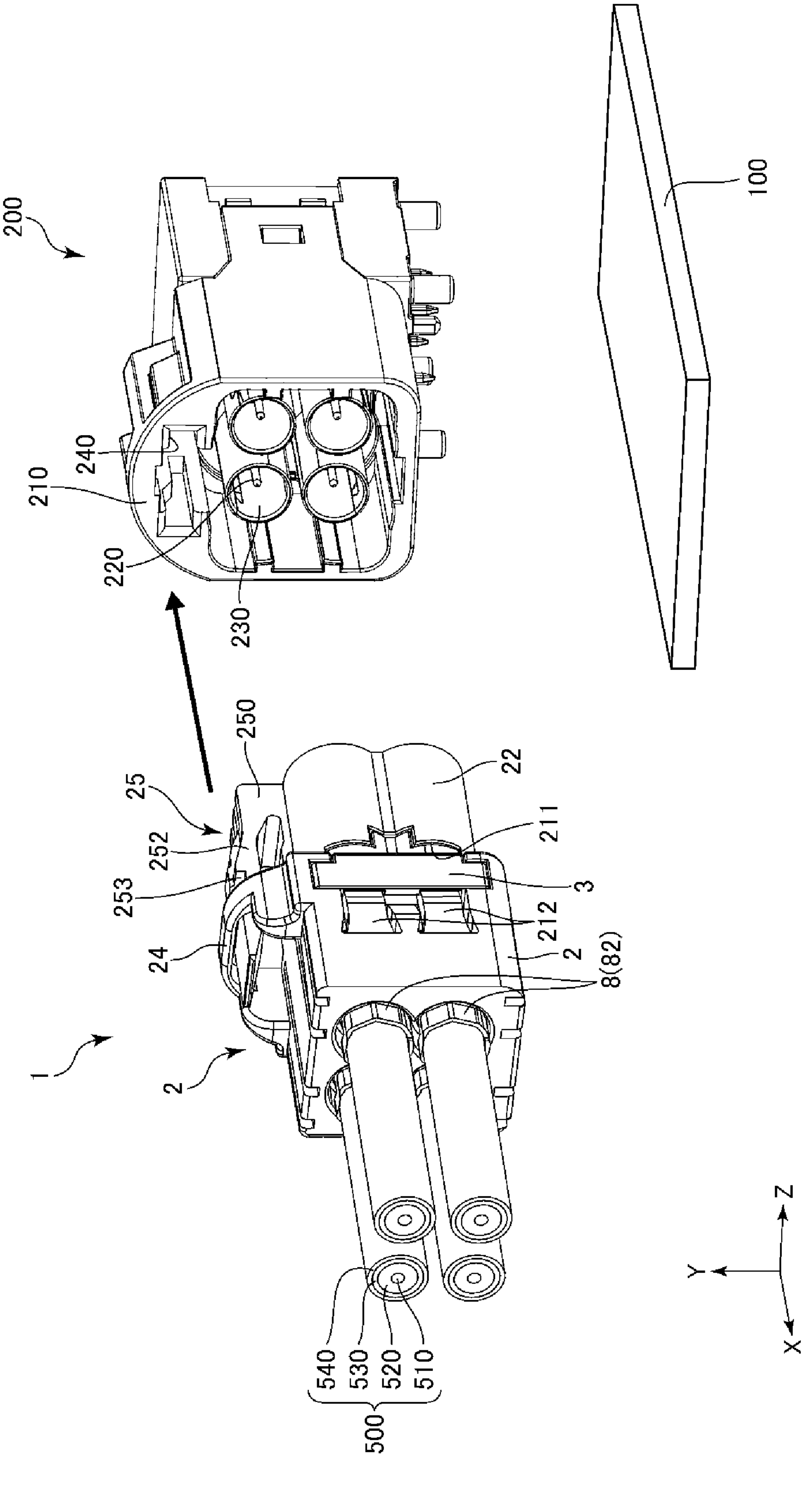
FIG. 2 is a perspective view showing an electrical connector according to a first embodiment of the present disclosure, coaxial cables connected to the electrical connector, a mating connector to be coupled with the electrical connector according to the first embodiment of the present disclosure and a circuit board on which the mating connector should be mounted.
Figure 3:
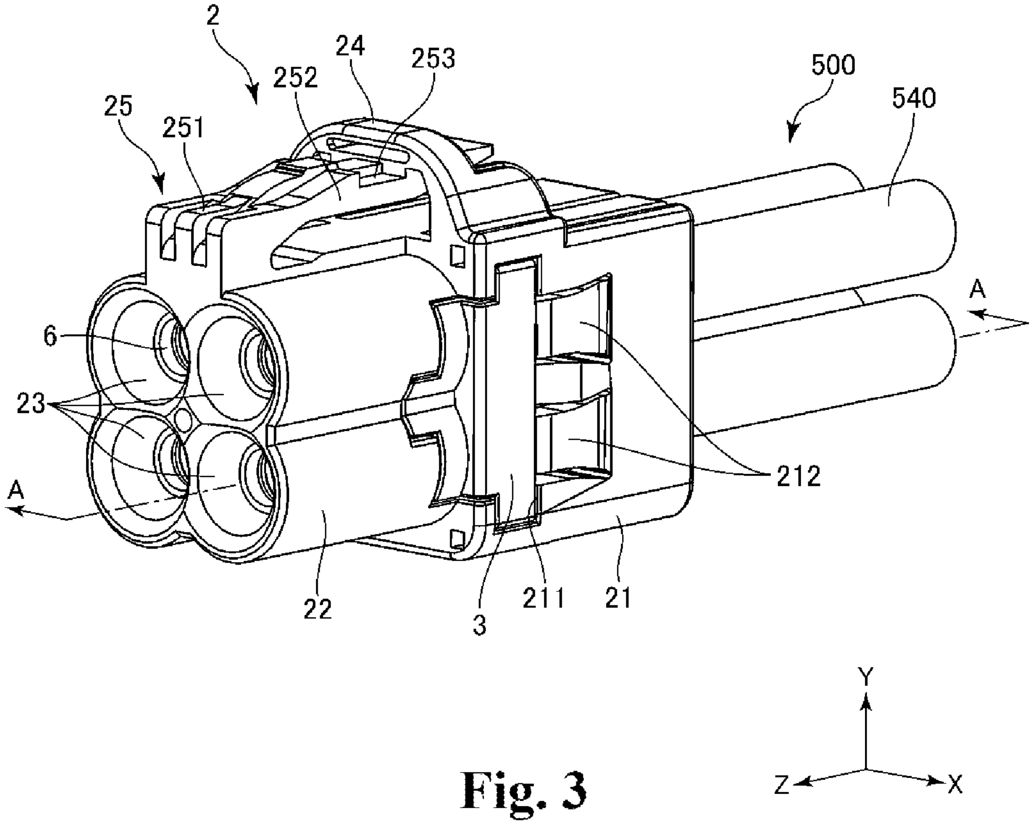
FIG. 3 is a perspective view of the electrical connector and the coaxial cables shown in FIG. 2.
Figure 4:
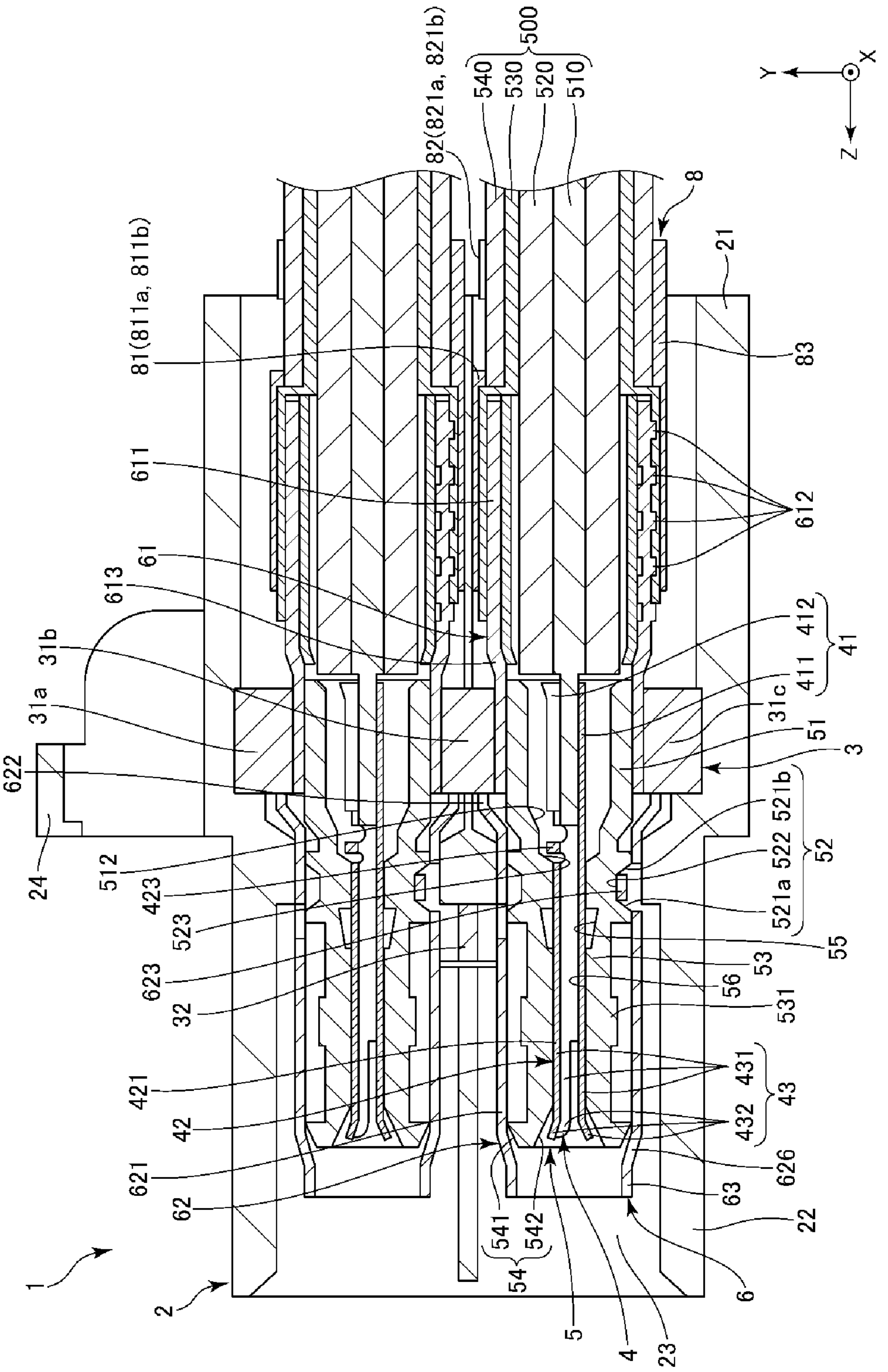
FIG. 4 is a cross-sectional view taken along an A-A line shown in FIG. 3.
Figure 5:
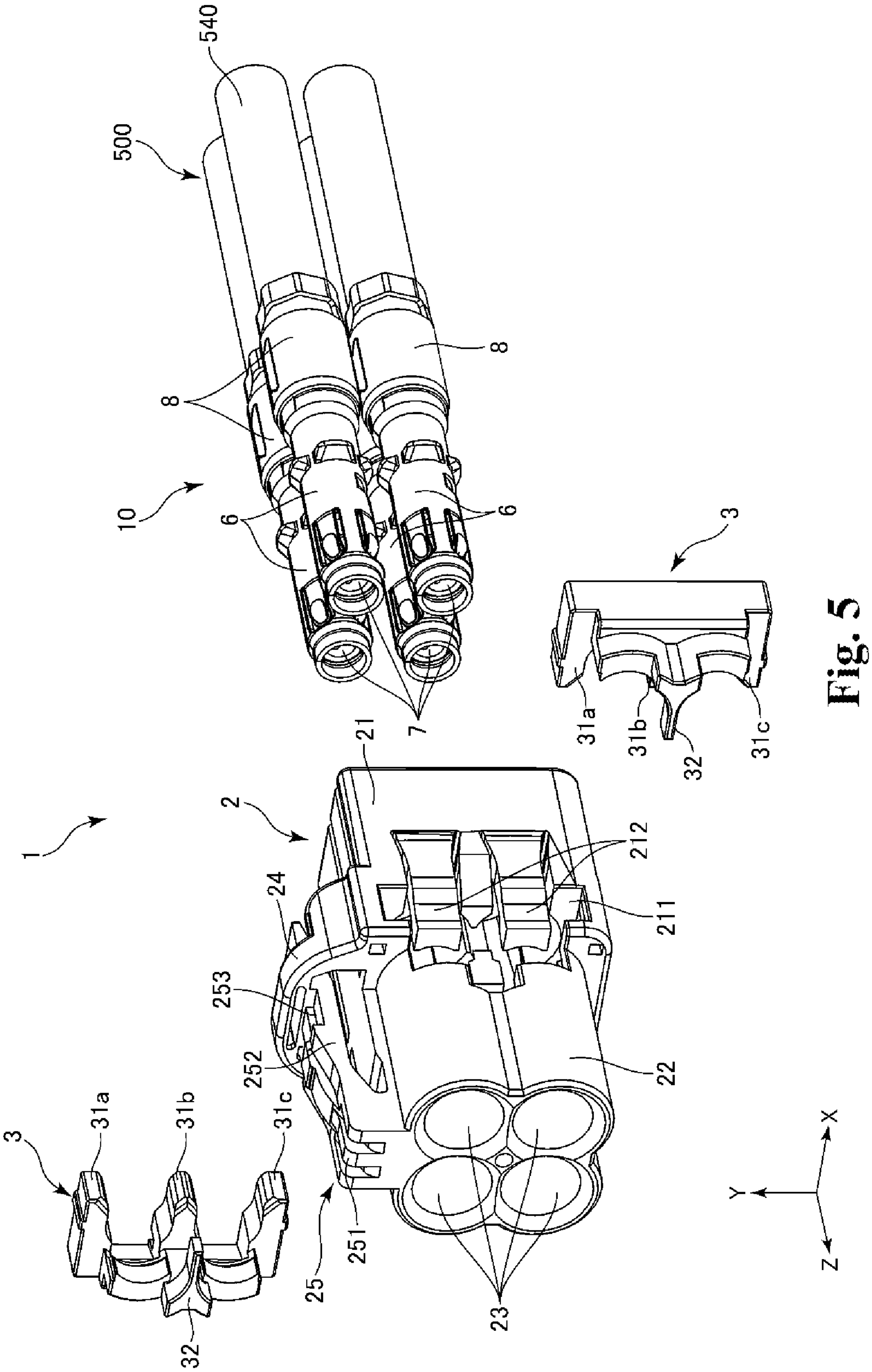
FIG. 5 is an exploded perspective view of the electrical connector and the coaxial cables shown in FIG. 3.
Figure 6:
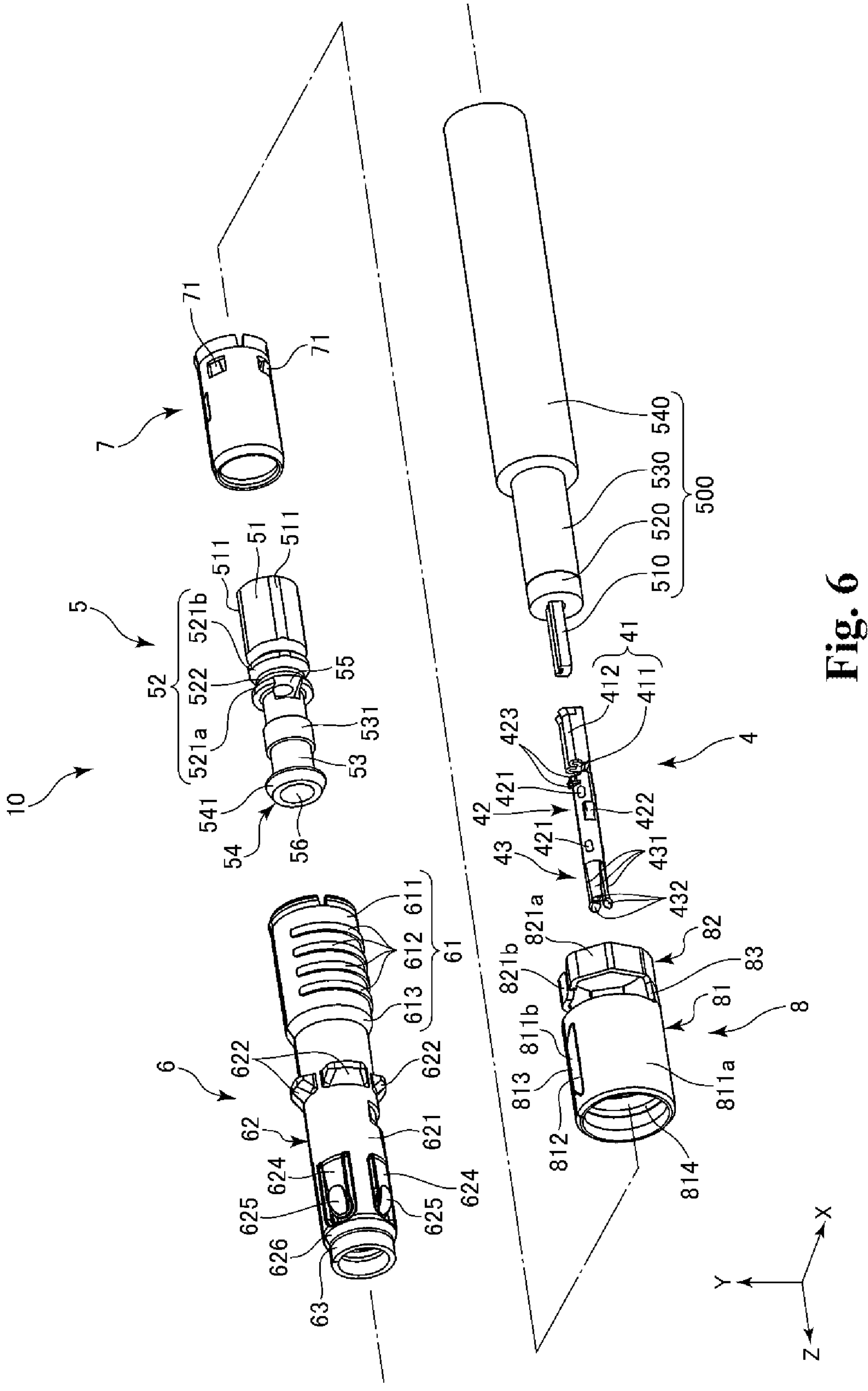
FIG. 6 is an exploded perspective view of a connector assembly and the coaxial cable shown in FIG. 3.
Figure 7:
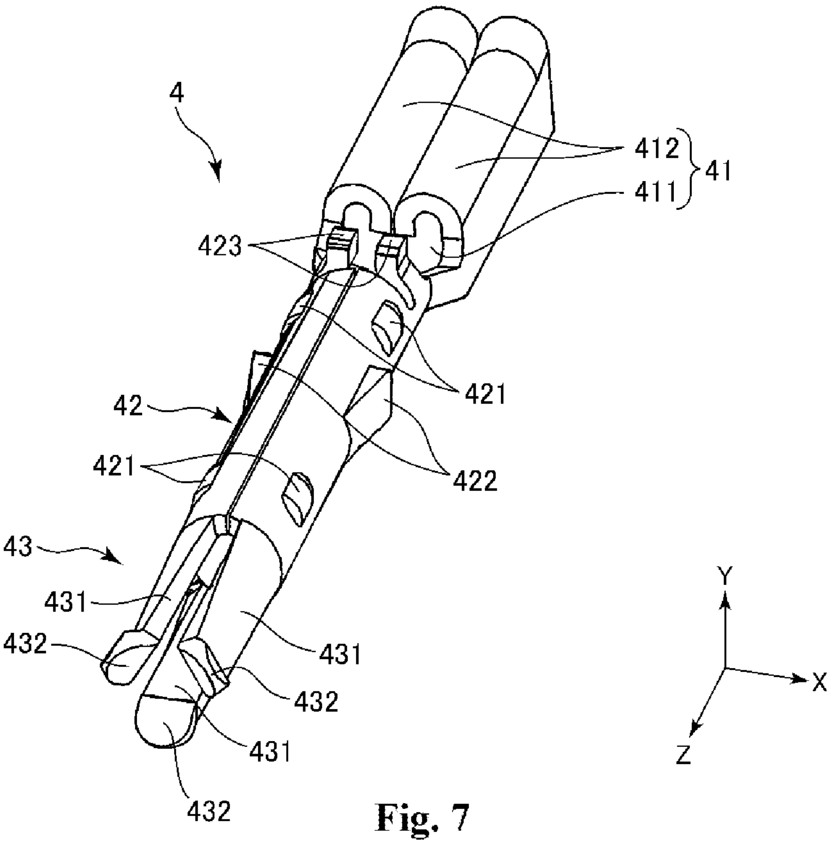
FIG. 7 is a perspective view of a contact pin.
Figure 8:
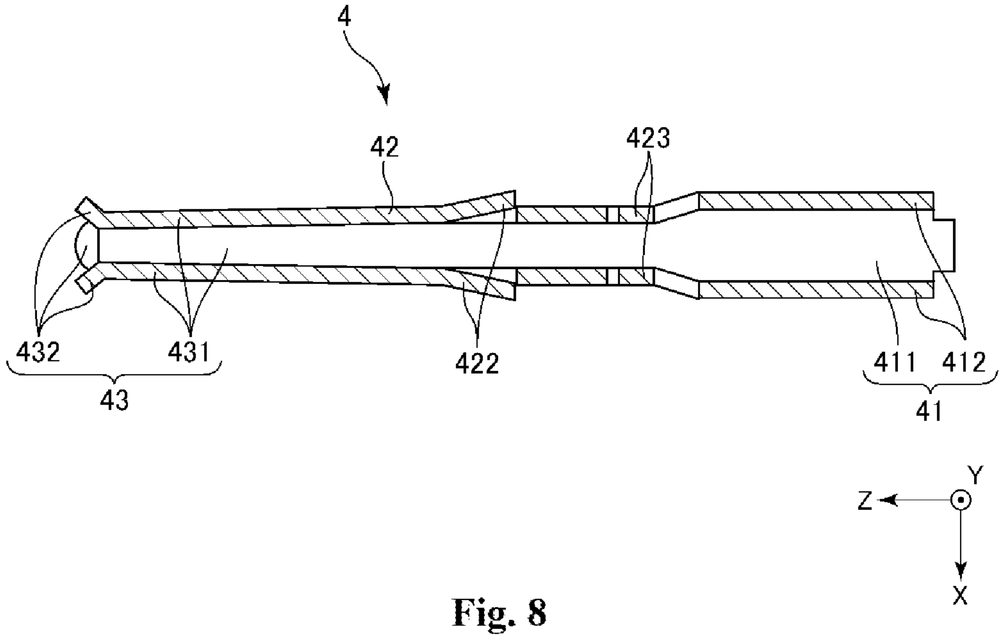
FIG. 8 is a XZ plane cross-sectional view of the contact pin shown in FIG. 7.
Figure 9:
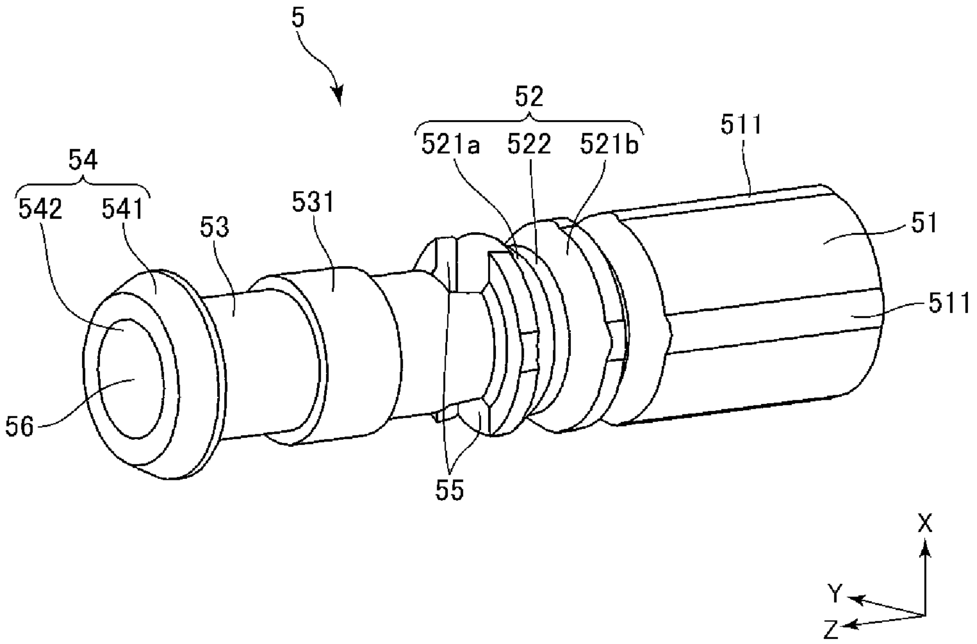
FIG. 9 is a perspective view of a housing.
Figure 10:
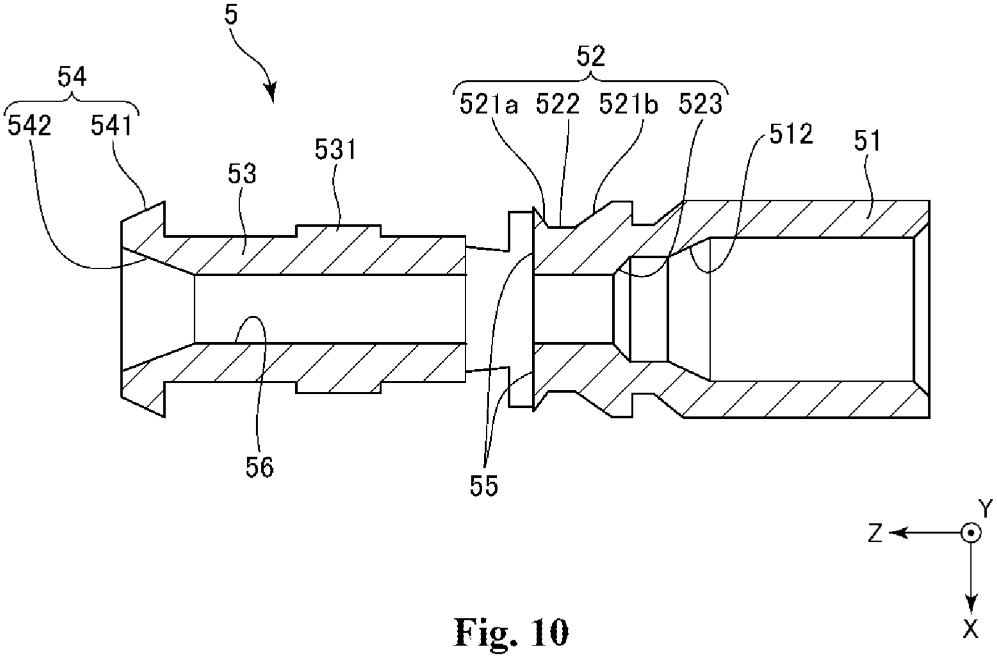
FIG. 10 is a XZ plane cross-sectional view of the housing shown in FIG. 9.
Figure 11A:
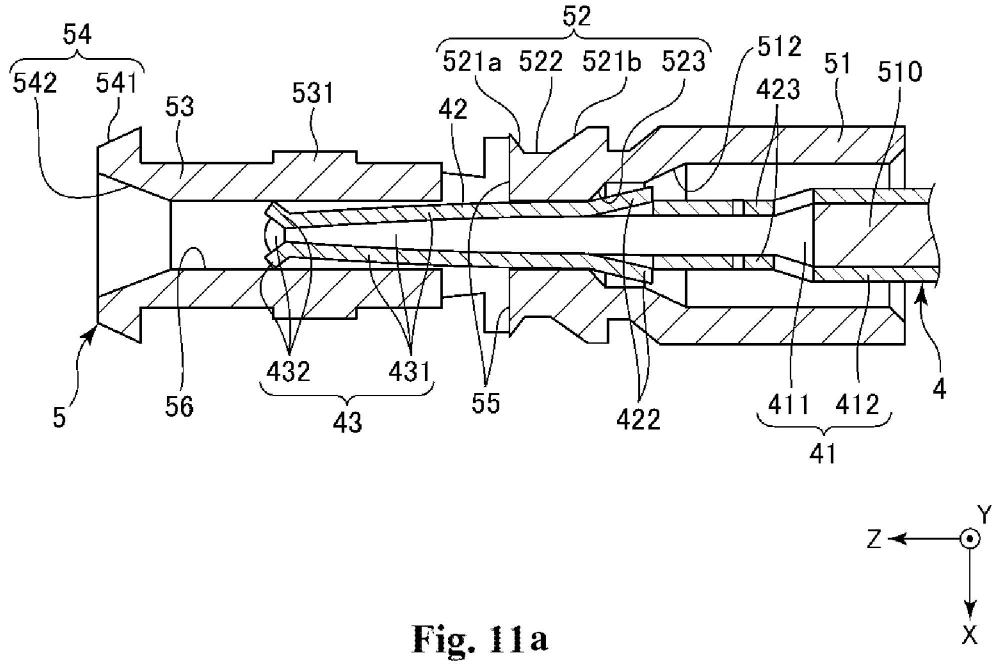
FIG. 11*a* is a XZ plane cross-sectional view of the contact pin and the housing at a beginning phase of press-fitting of the contact pin into an insertion hole of the housing.
Figure 11B:
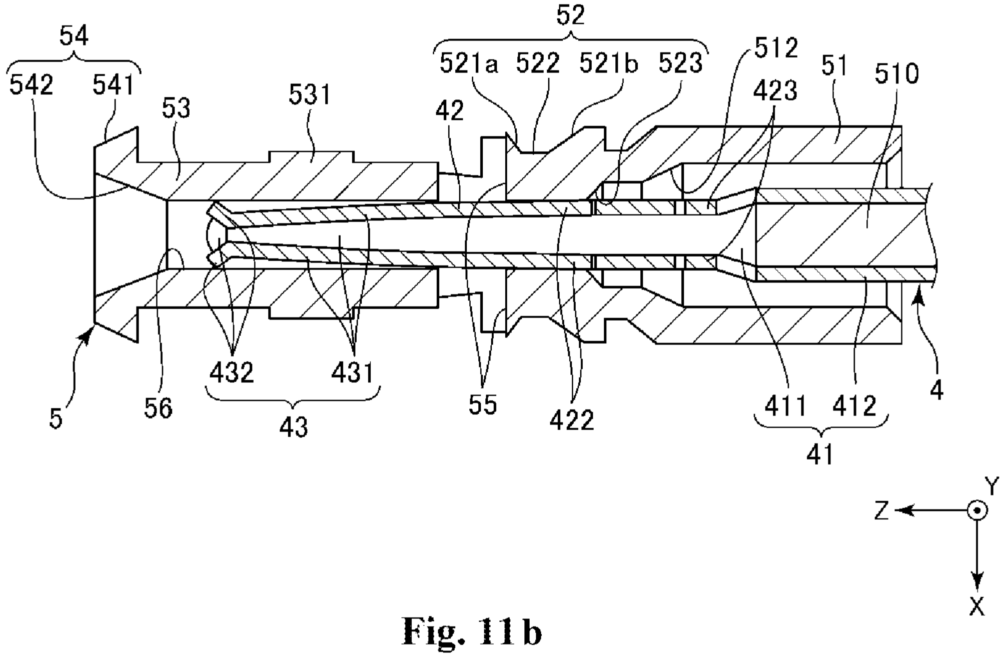
FIG. 11*b* is a XZ plane cross-sectional view of the contact pin and the housing in a middle phase of the press-fitting of the contact pin into the insertion hole of the housing.
Figure 11C:
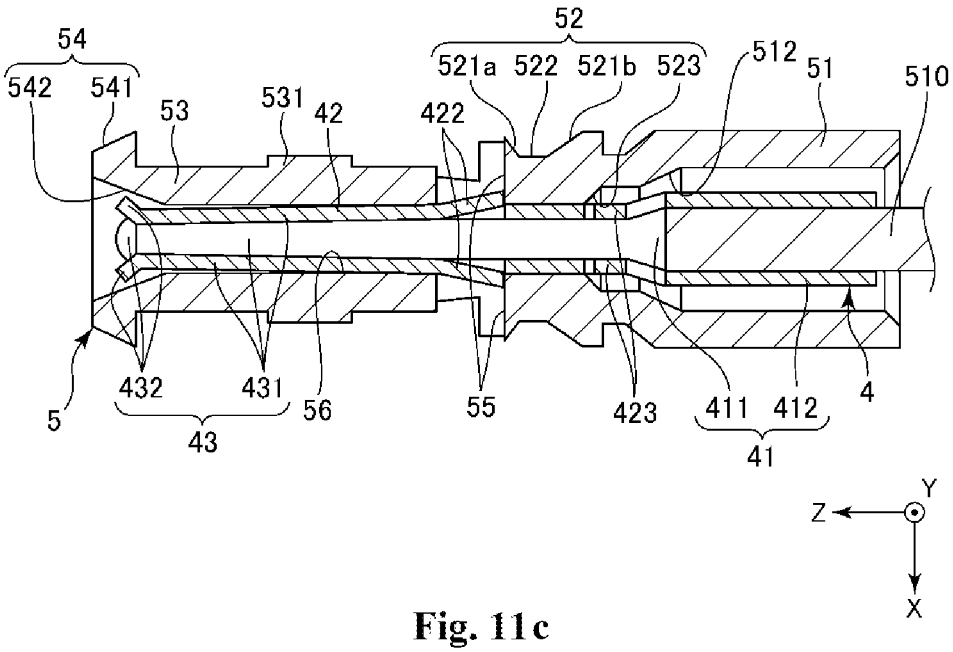
FIG. 11*c* is a XZ plane cross-sectional view of the contact pin and the housing at an end phase of the press-fitting of the contact pin into the insertion hole of the housing.
Figure 12:
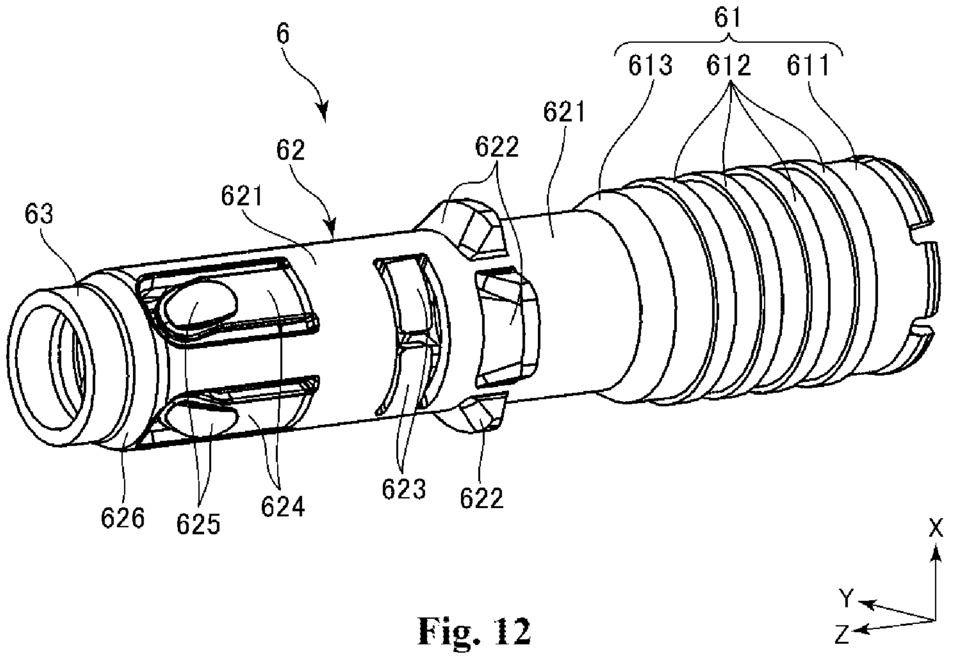
FIG. 12 is a perspective view of an outer contact.
Figure 13:
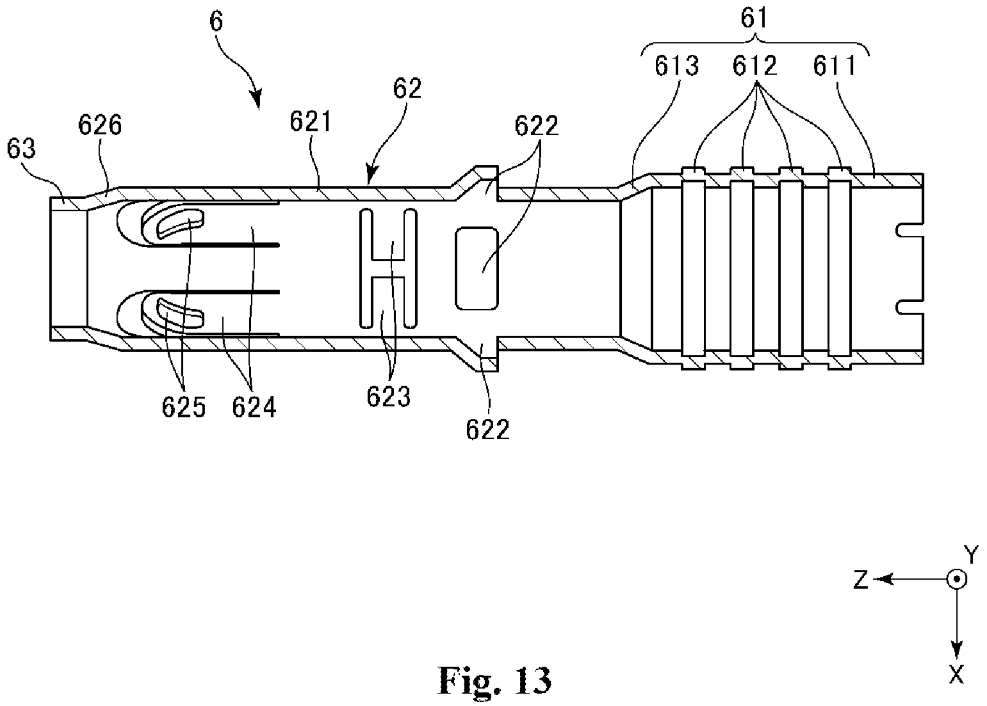
FIG. 13 is a XZ plane cross-sectional view of the outer contact shown in FIG. 12.
Figure 14:
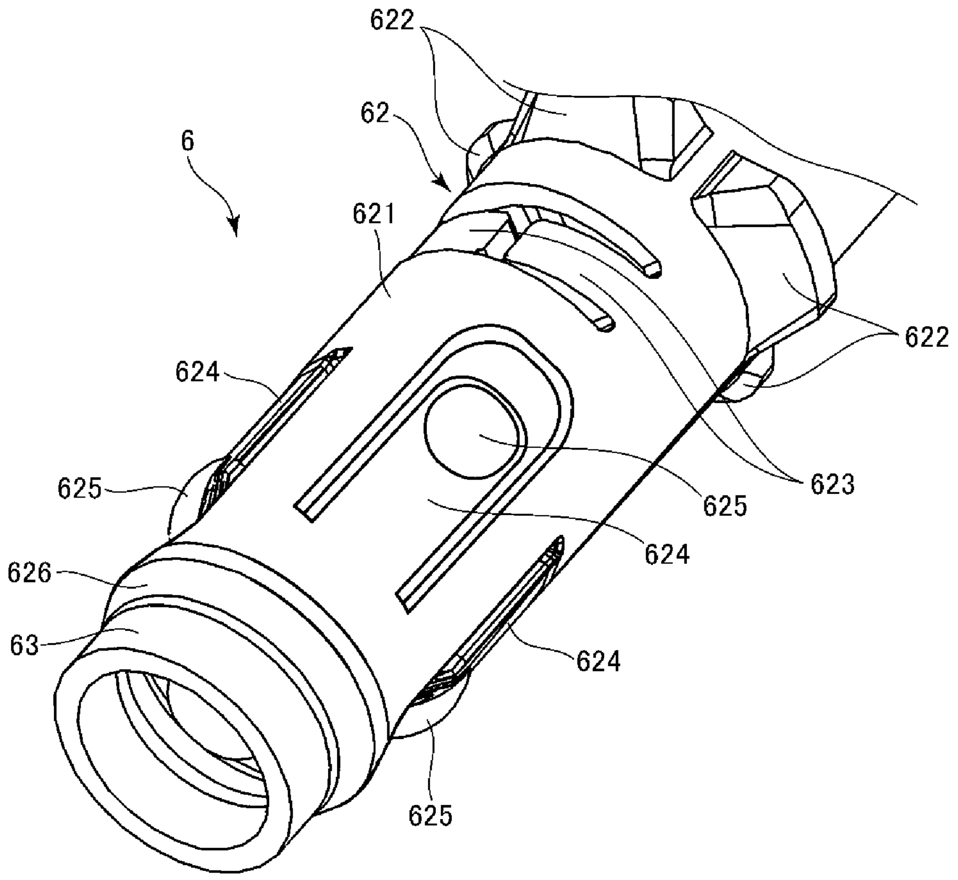
FIG. 14 is a perspective view of a modified example of the outer contact.
Figure 15:
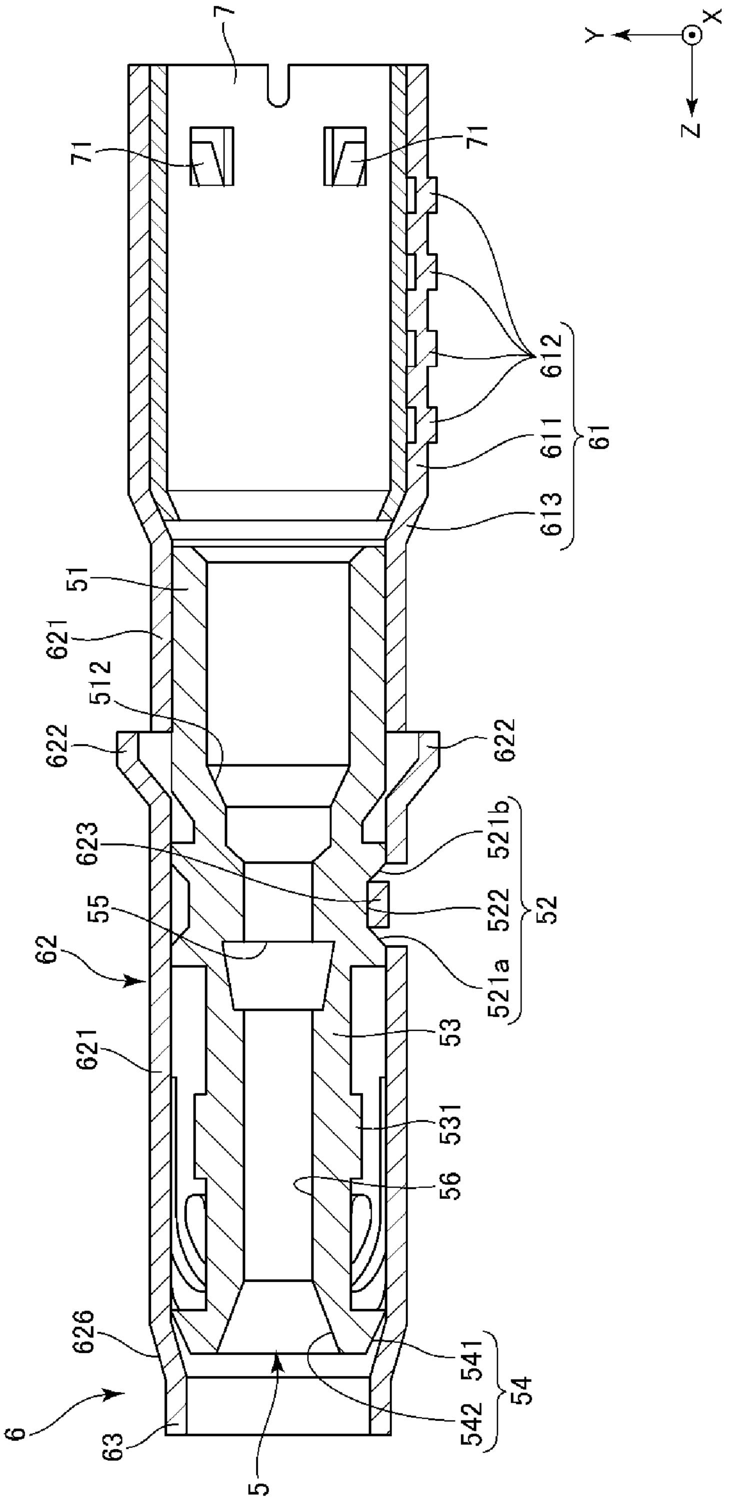
FIG. 15 is a YZ plane cross-sectional view of the outer contact, the housing and a ring member in a state that the housing and the ring member are contained in the outer contact.
Figure 16:
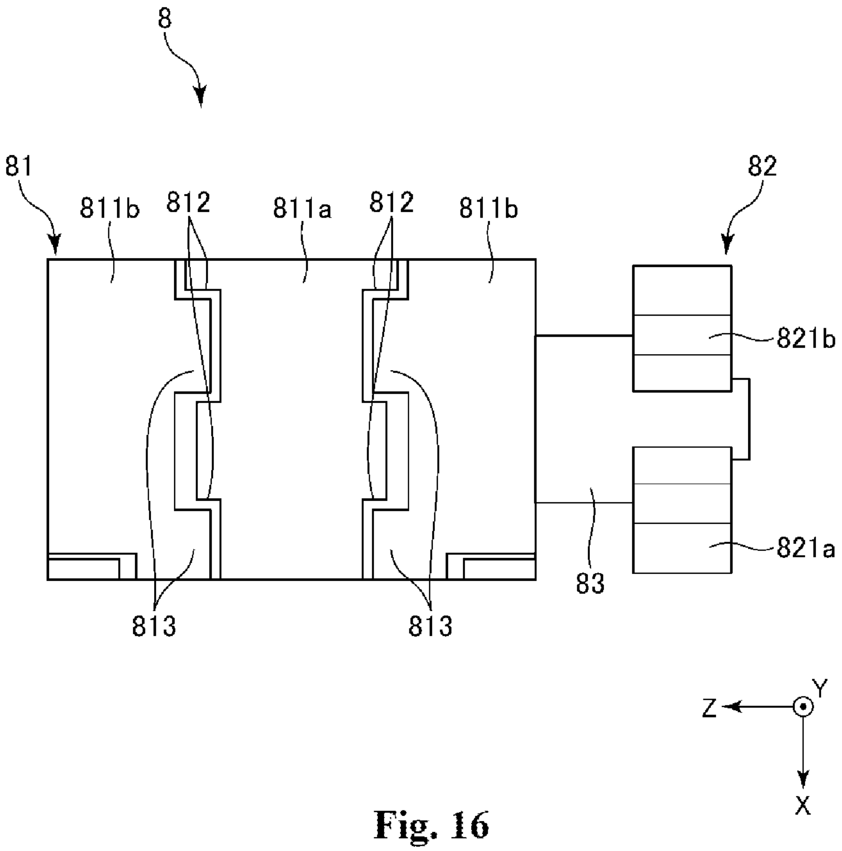
FIG. 16 is a planar view of a modified example of a crimping member.
Figure 17:
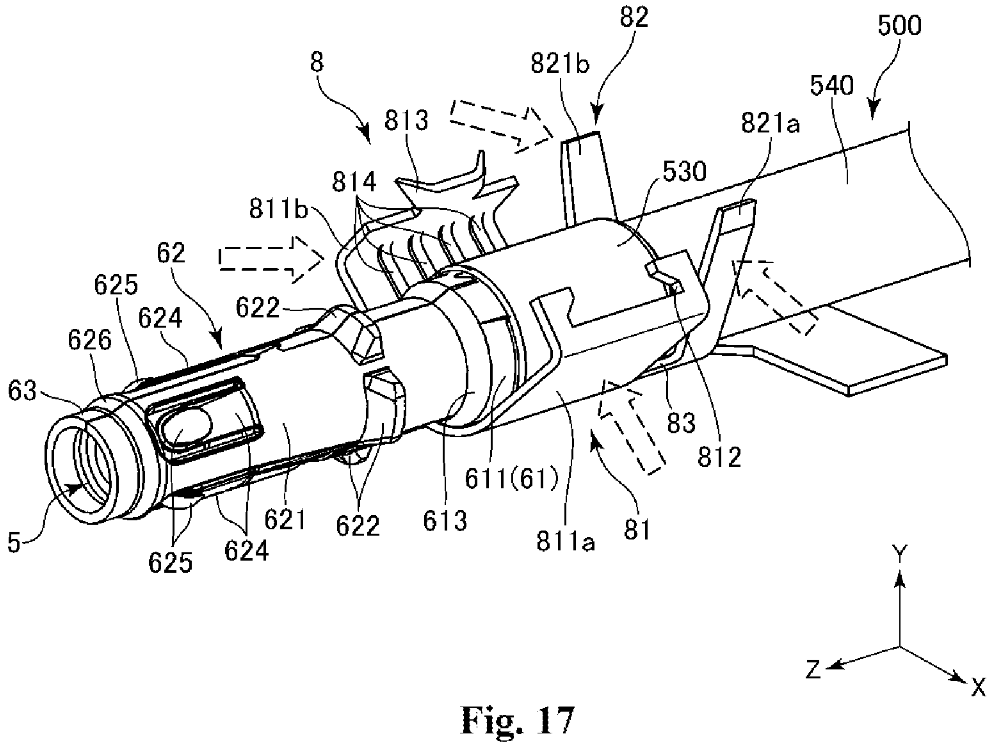
FIG. 17 is a diagram for explaining attachment of the outer contact with respect to the coaxial cable through the crimping member.
Figure 18:
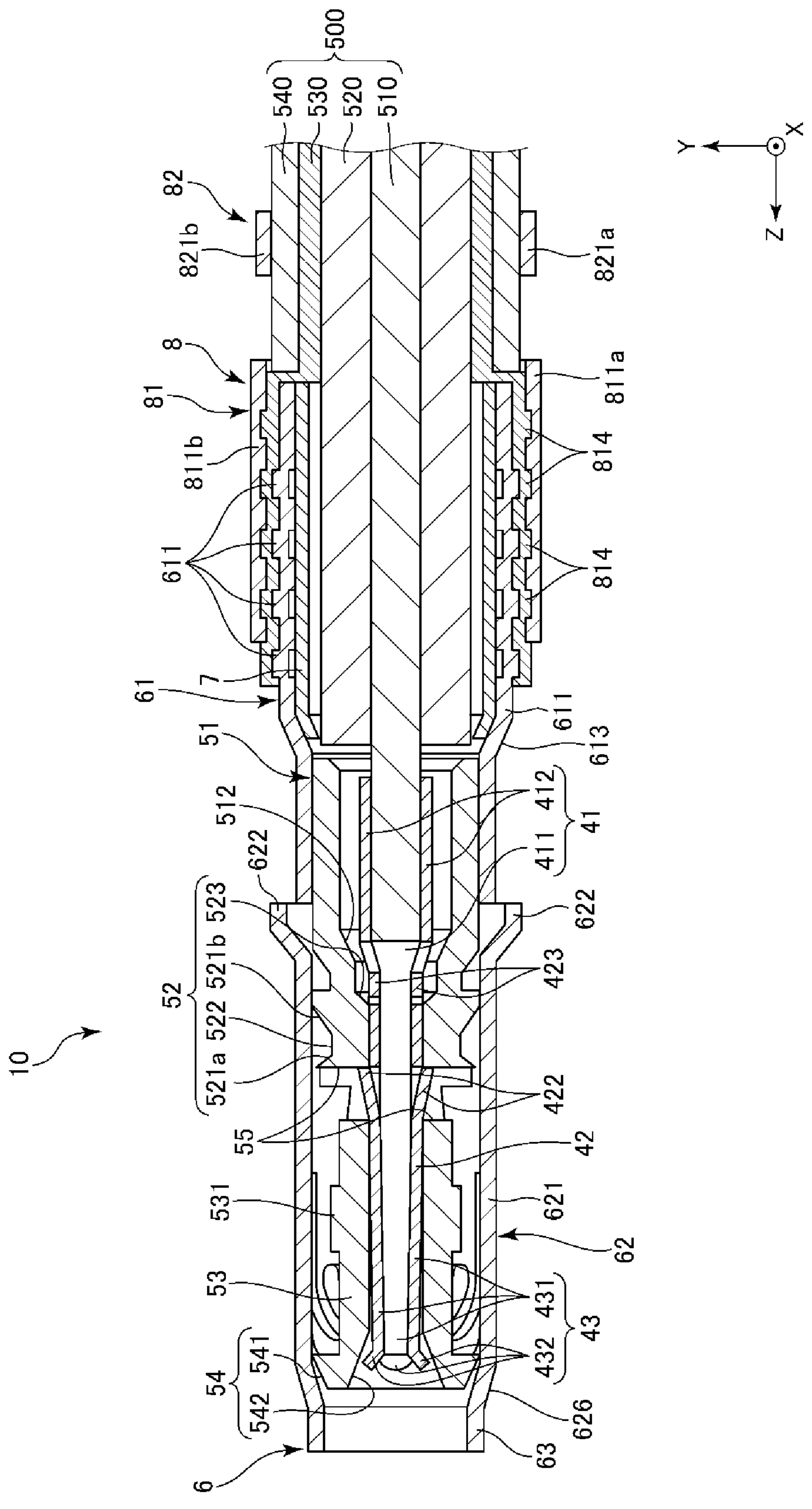
FIG. 18 is a YZ plane cross-sectional view of the connector assembly and the coaxial cable in a state that the connector assembly is attached to the coaxial cable.
Figure 19:
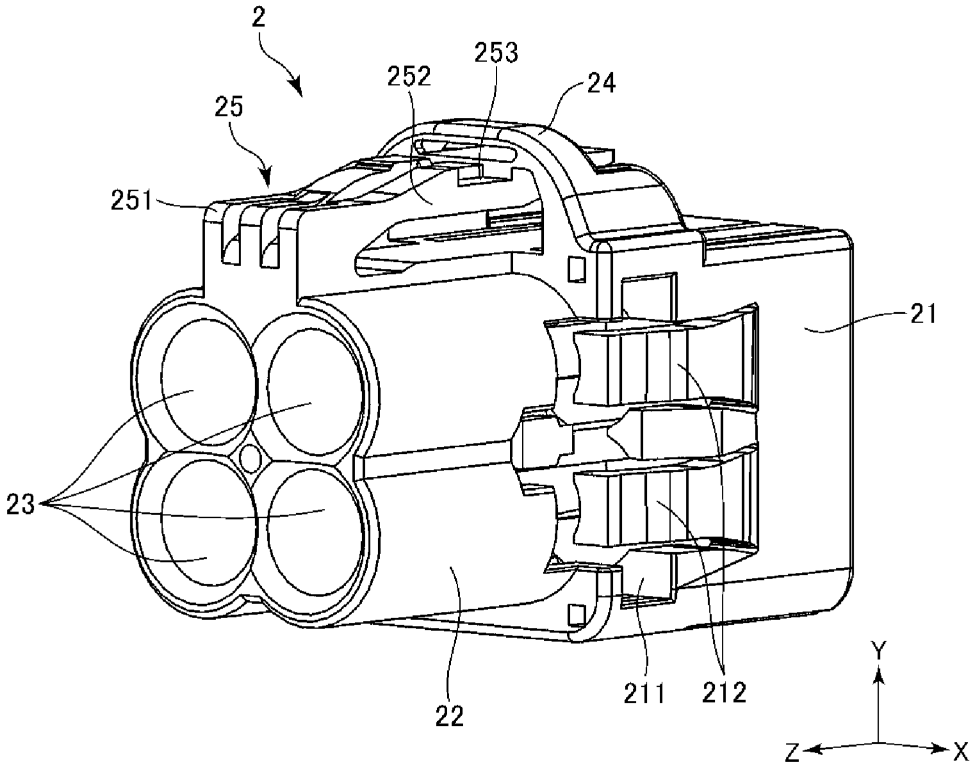
FIG. 19 is a perspective view of a case.
Figure 20:
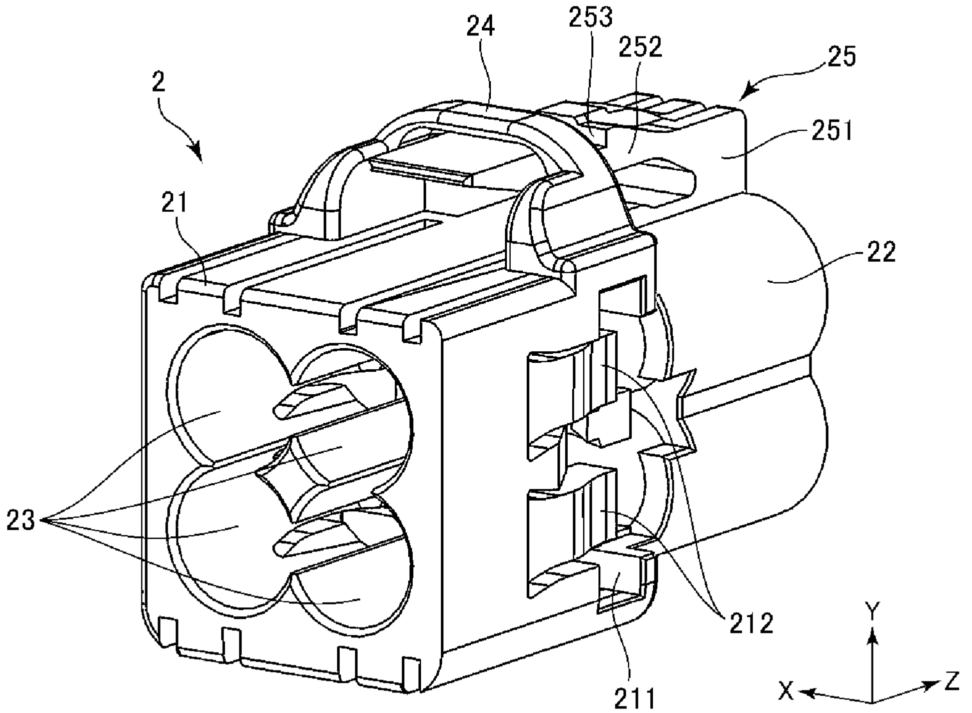
FIG. 20 is a perspective view showing the case shown in FIG. 19 from another angle.
Figure 21:
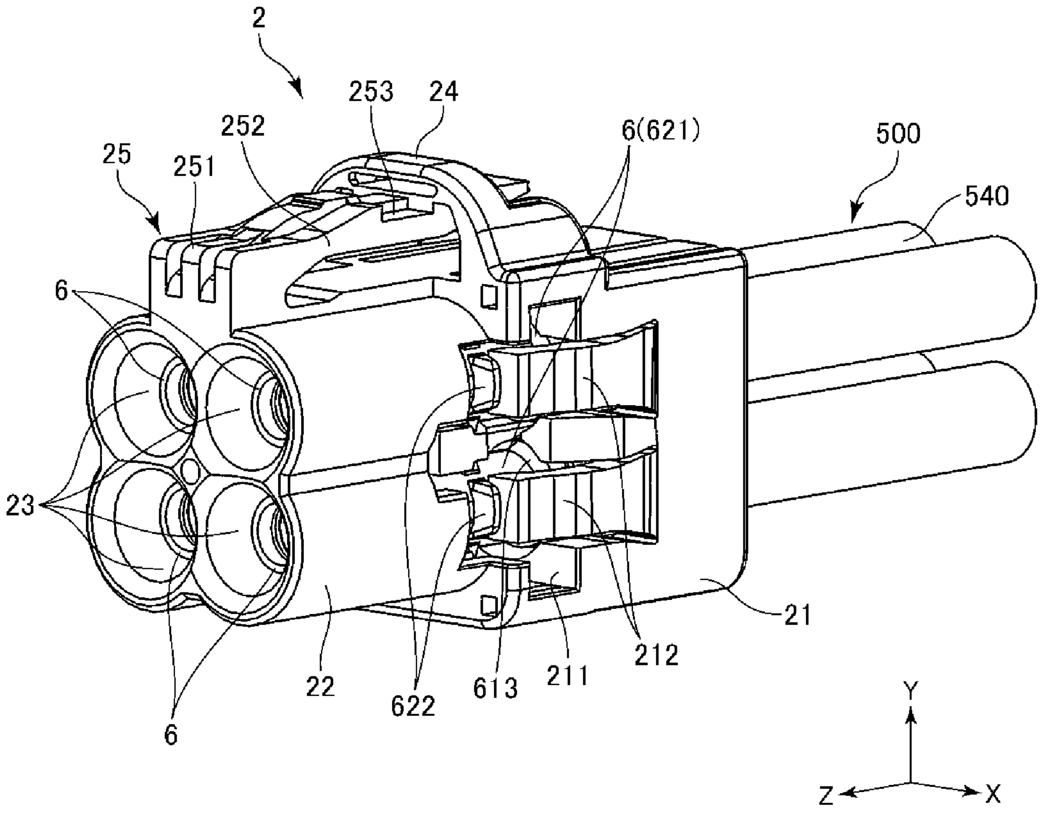
FIG. 21 is a perspective view showing a state that the four coaxial cables to which the connector assembly is attached are press-fitted into the case.
Figure 22A:
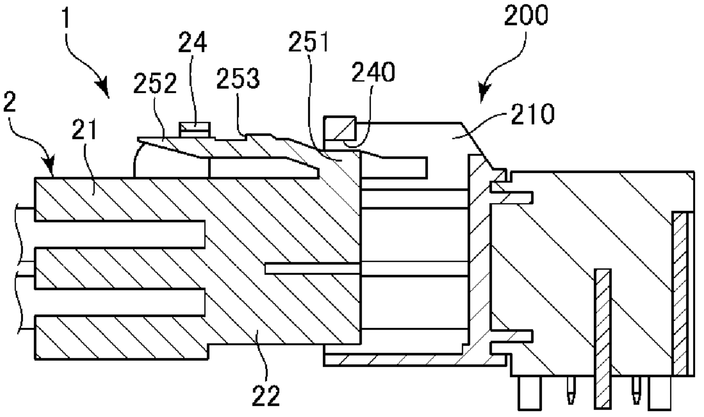
FIG. 22*a* is a view showing a state of a lever portion at a beginning phase of coupling of the electrical connector with respect to the mating connector.
Figure 22B:
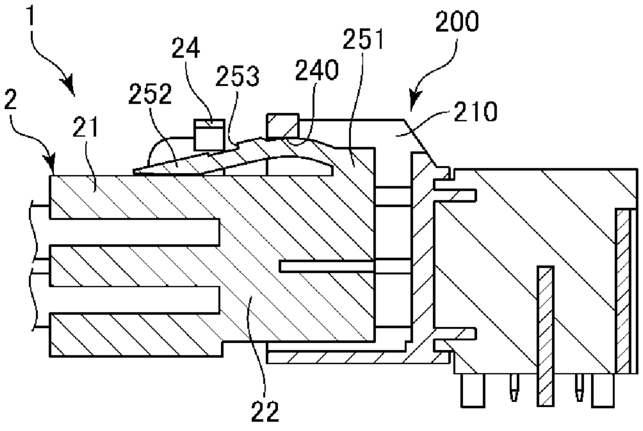
FIG. 22*b* is a view showing a state of the lever portion at a middle phase of the coupling of the electrical connector with respect to the mating connector.
Figure 22C:
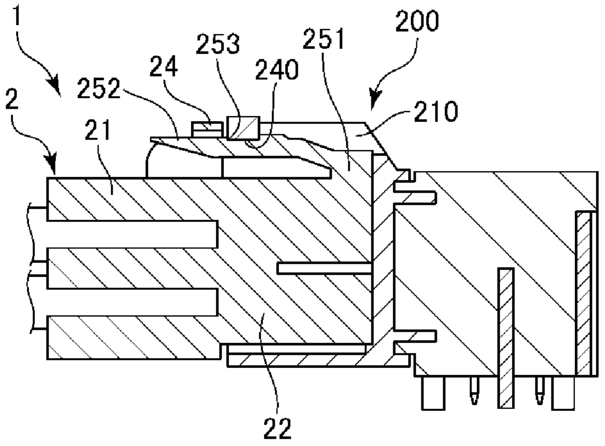
FIG. 22*c* is a view showing a state of the lever portion at an end phase of the coupling of the electrical connector with respect to the mating connector.
Figure 23:
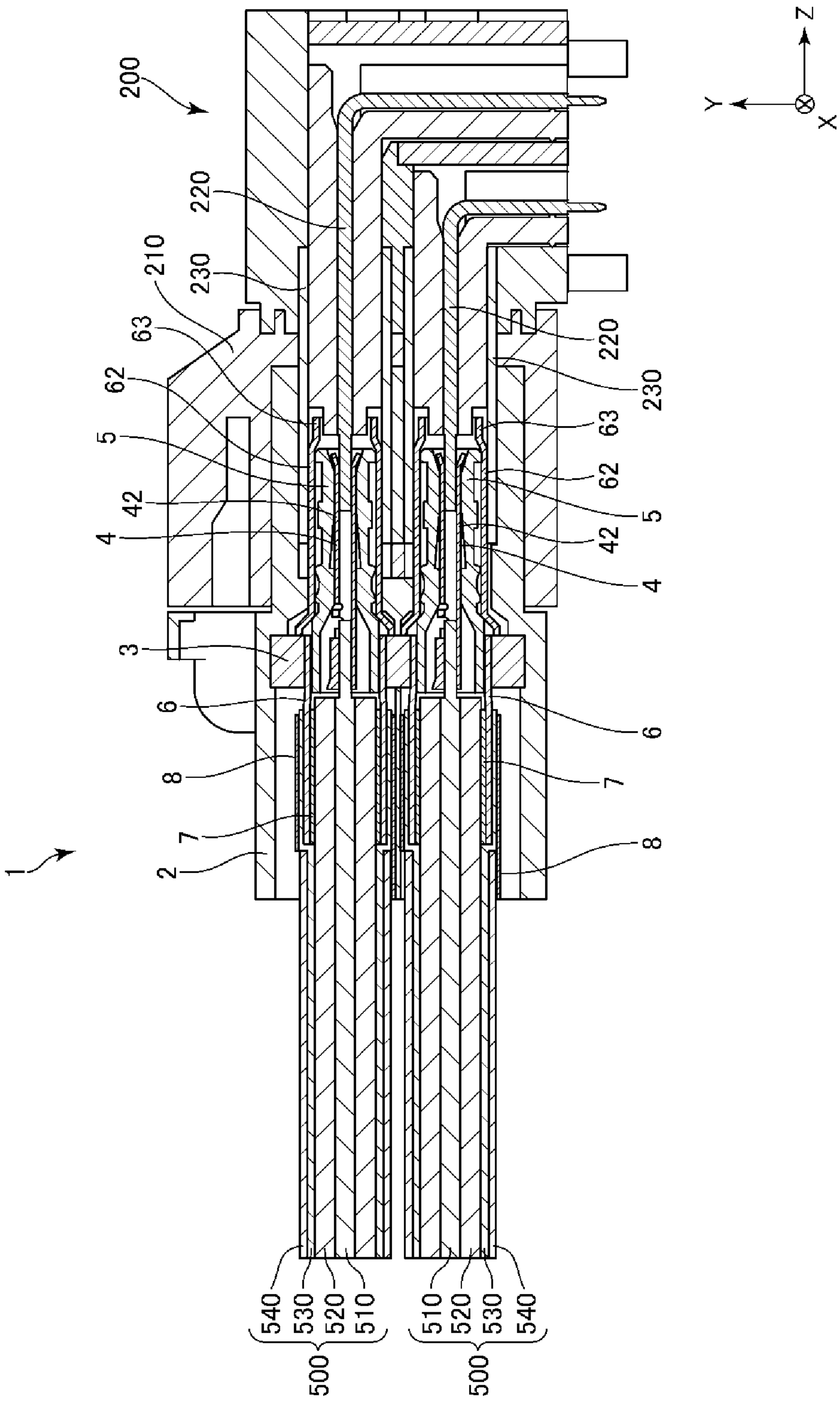
FIG. 23 is a YZ plane cross-sectional view of the electrical connector and the mating connector in a state that the electrical connector is coupled with the mating connector.

First, an electrical connector according to a first embodiment of the present disclosure will be described in detail with reference to FIGS. 2 to 23. FIG. 2 is a perspective view showing the electrical connector according to the first embodiment of the present disclosure, coaxial cables connected to the electrical connector, a mating connector to be coupled with the electrical connector according to the first embodiment of the present disclosure and a circuit board on which the mating connector should be mounted. FIG. 3 is a perspective view of the electrical connector and the coaxial cables shown in FIG. 2. FIG. 4 is a cross-sectional view taken along an A-A line shown in FIG. 3. FIG. 5 is an exploded perspective view of the electrical connector and the coaxial cables shown in FIG. 3. FIG. 6 is an exploded perspective view of a connector assembly and the coaxial cable shown in FIG. 3. FIG. 7 is a perspective view of a contact pin. FIG. 8 is a XZ plane cross-sectional view of the contact pin shown in FIG. 7. FIG. 9 is a perspective view of a housing. FIG. 10 is a XZ plane cross-sectional view of the housing shown in FIG. 9. FIG. 11*a* is a XZ plane cross-sectional view of the contact pin and the housing at a beginning phase of press-fitting of the contact pin into an insertion hole of the housing. FIG. 11*b* is a XZ plane cross-sectional view of the contact pin and the housing in a middle phase of the press-fitting of the contact pin into the insertion hole of the housing. FIG. 11*c* is a XZ plane cross-sectional view of the contact pin and the housing at an end phase of the press-fitting of the contact pin into the insertion hole of the housing. FIG. 12 is a perspective view of an outer contact. FIG. 13 is a XZ plane cross-sectional view of the outer contact shown in FIG. 12. FIG. 14 is a perspective view of a modified example of the outer contact. FIG. 15 is a YZ plane cross-sectional view of the outer contact, the housing and a ring member in a state that the housing and the ring member are contained in the outer contact. FIG. 16 is a planar view of a modified example of a crimping member. FIG. 17 is a diagram for explaining attachment of the outer contact with respect to the coaxial cable through the crimping member. FIG. 18 is a YZ plane cross-sectional view of the connector assembly and the coaxial cable in a state that the connector assembly is attached to the coaxial cable. FIG. 19 is a perspective view of a case. FIG. 20 is a perspective view showing the case shown in FIG. 19 from another angle. FIG. 21 is a perspective view showing a state that the four coaxial cables to which the connector assembly is attached are press-fitted into the case. FIG. 22*a* is a view showing a state of a lever portion at a beginning phase of coupling of the electrical connector with respect to the mating connector. FIG. 22*b* is a view showing a state of the lever portion at a middle phase of the coupling of the electrical connector with respect to the mating connector. FIG. 22*c* is a view showing a state of the lever portion at an end phase of the coupling of the electrical connector with respect to the mating connector. FIG. 23 is a YZ plane cross-sectional view of the electrical connector and the mating connector in a state that the electrical connector is coupled with the mating connector.

As shown in FIG. 2, an electrical connector 1 according to the first embodiment of the present disclosure is a plug connector to be inserted with respect to a mating connector (a receptacle connector) 200 mounted on a circuit board 100 provided in an arbitrary device so as to be coupled with the mating connector 200. When the electrical connector 1 attached to one end portions of four coaxial cables 500 is inserted into the mating connector 200 and the electrical connector 1 is coupled with the mating connector 200, an electrical connection between the four coaxial cables 500 and the circuit board 100 is provided through the electrical connector 1 and the mating connector 200.

Each of the coaxial cables 500 has a coaxial structure in which a core wire (an inner conductor layer) 510, an inner insulator layer 520 covering the core wire 510, an outer conductor layer (a braided layer) 530 covering the inner insulator layer 520 and an outer insulator layer 540 covering the outer conductor layer 530 are concentrically arranged. In particular, the outer conductor layer 530 is formed by braiding thin element wires each made of a highly conductive metallic material such as copper into a netlike shape. Thus, by unweaving the element wires constituting the outer conductor layer 530, it is possible to open the outer conductor layer 530 for exposing the inner insulator layer 520 toward the outside. Further, by returning the opened element wires so as to be straight, it is also possible to again cover the inner insulator layer 520 with the outer conductor layer 530. The outer conductor layer 530 may further contain a conductive thin film which is made of a highly conductive metallic material such as aluminum and covers a layer of brained element wires.

Although this matter is omitted in FIG. 2, another end portion of each of the coaxial cable 500 is connected to another device than the device including circuit board 100. Thus, when the electrical connector 1 is coupled with the mating connector 200, it becomes possible to perform a signal communication between the device including the circuit board 100 and the other device through the coaxial cables 500. The device including the circuit board 100 is typically an ECU (Electronic Control Unit) for controlling operations of a vehicle. The other device to which the other end portions of the coaxial cables 500 are connected is typically an in-vehicle device such as a car navigation, a car audio, an in-vehicle camera, an in-vehicle GPS, an in-vehicle TV and an in-vehicle radio. By coupling the electrical connector 1 and the mating connector 200 with each other, it becomes possible to perform a high-speed signal communication between the in-vehicle device and the ECU through the four coaxial cables 500. The electrical connector 1 may be a 1-pin connector for providing one coaxial connection with one coaxial cable 500 or a multi-pin connector for providing multi coaxial connections with a plurality of coaxial cables 500. Hereinafter, the electrical connector 1 of the present embodiment will be described with assuming that the electrical connector 1 is a 4-pin connector for providing coaxial connections with the four coaxial cables 500.

As shown in FIGS. 2 to 5, particularly in FIG. 5, the electrical connector 1 includes four connector assemblies 10 to be respectively connected to the one end portions of the four coaxial cables 500, a cover 2 for holding the four connector assemblies 10 therein and a pair of fixing members 3 for fixing the four connector assemblies 10 in the cover 2.

Each of the connector assemblies 10 is a cylindrical member to be attached to the one end portion of each of the coaxial cables 500. Since all of the four connector assemblies 10 have the same structure, a structure of one connector assembly 10 will be described in detail as a representative. As shown in FIG. 6, the connector assembly 10 includes a contact pin 4 to be connected to the core wire 510 of the coaxial cable 500, an insulating housing 5 for holding the contact pin 4 therein, a cylindrical outer contact 6 covering the housing 5, a ring member 7 for supporting a base end portion 61 of the outer contact 6 from the inner side and a crimping member 8 for attaching the outer contact 6 to the coaxial cable 500.

The contact pin 4 is a cylindrical member which is made of a conductive material such as a copper alloy and should be connected to the core wire 510 of the coaxial cable 500. As shown in FIGS. 7 and 8, the contact pin 4 includes a holding portion 41 for holding the core wire 510 of the coaxial cable 500 therein by crimping the core wire 510, a cylindrical portion 42 extending from a tip end portion of the holding portion 41 toward the tip side and a guide portion 43 which is formed at a tip end of the cylindrical portion 42 and guides insertion of a corresponding contact pin 220 (see FIG. 2) of the mating connector 200.

The holding portion 41 includes a bottom plate 411 and a pair of wall portions 412 which extend from the bottom plate 411 toward the upper side (the +Y direction side) and should press the core wire 510 of the coaxial cable 500 onto the bottom plate 411. Although the pair of wall portions 412 are curved so that tip end portions of the wall portions 412 are directed toward the lower side in the illustrated aspect, the pair of wall portions 412 linearly extend from the bottom plate 411 toward the upper side and face each other in a state before the contact pin 4 is connected to the core wire 510 of the coaxial cable 500. The contact pin 4 is connected to the core wire 510 of the coaxial cable 500 according to the following procedure. First, the core 510 of the coaxial cable 500 is placed on the bottom plate 411. Next, a swaging process in which the tip end portions of the pair of wall portions 412 linearly extending from the bottom plate 411 toward the upper side are bent toward the lower side by using a suitable tool such as crimp pliers so that the tip end portions of the pair of wall portions 412 contact with the core wire 510 of the coaxial cable 500 is performed for pressing the core wire 510 of the coaxial cable 500 onto the bottom plate 411. By such a swaging process, the core wire 510 of the coaxial cable 500 is strongly held in the holding portion 41, and thereby the contact pin 4 is connected to the core wire 510 of the coaxial cable 500.

The cylindrical portion 42 is a portion for receiving the corresponding contact pin 220 of the mating connector 200. The cylindrical portion 42 is formed so as to extend from the tip end portion of the holding portion 41 toward the tip side. The cylindrical portion 42 includes three ribs 421 protruding from each of outer peripheral surfaces of a base end portion and the tip end portion of the cylindrical portion 42 in a radial direction of the cylindrical portion 42, a pair of spring portions 422 protruding from the cylindrical portion 42 toward the outer side (the X direction) and a pair of positioning protrusions 423 protruding from the outer peripheral surface of the base end portion of the cylindrical portion 42 toward the upper side.

The three ribs 421 are formed on the outer peripheral surface of the base end portion of the cylindrical portion 42 at equal angular intervals. Similarly, the three ribs 421 are formed on the outer peripheral surface of the tip end portion of the cylindrical portion 42 at equal angular intervals. The ribs 421 contact with an inner peripheral surface of the housing 5 when the contact pin 4 is press-fitted into the housing 5. With this configuration, it is possible to ensure concentricity between the contact pin 4 and the housing 5 as well as prevent backlash of contact pin 4 in the housing 5. Further, by ensuring the concentricity between the contact pin 4 and the housing 5, it is possible to improve the signal transmission characteristics of the electrical connector 1.

Although the three ribs 421 are formed on each of the outer peripheral surfaces of the base end portion and the tip end portion of the cylindrical portion 42 at the equal angular intervals in the illustrated aspect, the number of ribs 421 is not limited thereto. Four or more ribs 421 may be formed at equal angular intervals. By forming at least three ribs 421 at equal angular intervals, it is possible to provide the above-mentioned effect of ensuring the concentricity between the contact pin 4 and the housing 5 and the above-mentioned effect of preventing the backlash of the contact pin 4 in the housing 5.

The pair of spring portions 422 are formed for providing a click feeling indicating that the press-fitting of the contact pin 4 into the housing 5 is completed when the contact pin 4 is press-fitted into the housing 5 and preventing the contact pin 4 from being removed from the housing 5. Each of the pair of spring portions 422 has a tapered shape whose height gradually increases from the tip side toward the base side. Further, each of the pair of spring portions 422 is configured to be elastically deformed toward the inner side. When the contact pin 4 is press-fitted into the housing 5, the pair of spring portions 422 are gradually and elastically deformed toward the inner side along their tapered shape. Thereafter, when the pair of spring portions 422 reaches after-mentioned engagement holes 55 (see FIGS. 9 and 10) of the housing 5, the pair of spring portions 422 elastically recover to the outside and respectively engage with the engagement holes 55 of the housing 5. This elastic restoration of the pair of spring portions 422 when the pair of spring portions 422 are respectively engaged with the engagement holes 55 of the housing 5 provides the click feeling. Further, since the pair of spring portions 422 are respectively engaged with the engagement holes 55 of the housing 5, it is possible to prevent the contact pin 4 from being removed from the housing 5.

The pair of positioning protrusion 423 are formed for positioning the contact pin 4 in the housing 5. The pair of positioning protrusions 423 extend from the base end portion of the cylindrical portion 42 toward the upper side so as to face each other through a gap therebetween. When the press-fitting of the contact pin 4 into the housing 5 is completed, the pair of positioning protrusions 423 abut against an after-mentioned inner tapered surface 523 (see FIG. 10) formed on the inner peripheral surface of the housing 5, and thereby the press-fitting of the contact pin 4 into the housing 5 is regulated. With this configuration, the contact pin 4 is positioned in the housing 5.

The guide portion 43 is a portion for guiding the insertion of the corresponding contact pin 220 of the mating connector 200 into the cylindrical portion 42. The guide portion 43 includes three plate-like portions 431 protruding from a tip end surface of the cylindrical portion 42 toward the tip side with being spaced apart from each other and tapered portions 432 respectively formed at tip ends of the three plate-like portions 431.

Since all of the three plate-like portions 431 have the same structure, a structure of one plate-like portion 431 will be described below in detail as a representative. The plate-like portion 431 protrudes from the tip end surface of the cylindrical portion 42 toward the tip side. A base end portion of the plate-like portion 431 is integrated with the tip end surface of the cylindrical portion 42 and a tip end portion of the plate-like portion 431 is a free end. Further, an outer surface and an inner surface of the base end portion of the plate-like portion 431 are continuous with the outer peripheral surface and the inner peripheral surface of the cylindrical portion 42. The tapered portion 432 is formed at the tip end of the plate-like portion 431 so as to be inclined toward the outer side. An inner surface of the tapered portion 432 is a slope inclined from the outer side toward the inner side. The corresponding contact pin 220 of the mating connector 200 slides on the inner surface of the tapered portion 432 and the inner surface of the plate-like portion 431, thereby guiding the insertion of the corresponding contact pin 220 of the mating connector 200 into the cylindrical portion 42. Further, the three plate-like portions 431 are formed on the tip end surface of the cylindrical portion 42 at the equal angular intervals. Although the number of the plate-like portions 431 is three in the illustrated aspect, the present disclosure is not limited thereto. The scope of the present disclosure also involves an aspect in which four or more plate-like portions 431 are formed so as to protrude from the tip end surface of the cylindrical portion 42 toward the tip side.

The above-mentioned contact pin 4 is press-fitted into the housing 5 and held by the housing 5. Referring back to FIG. 6, the housing 5 is a cylindrical member made of an insulating material having elasticity such as a resin material. The housing 5 has a function of holding the contact pin 4 therein. As shown in FIGS. 9 and 10, the housing 5 includes a base end portion 51, a positioning portion 52 extending from the base end portion 51 toward the tip side, a small outer diameter portion 53 extending from the positioning portion 52 toward the tip side, a guide portion 54 formed at a tip end of the small outer diameter portion 53, the pair of engagement holes 55 formed across the positioning portion 52 and the small outer diameter portion 53 and an insertion hole 56 formed through which the housing 5 should be passed in the insertion and extraction direction (the Z direction) of the electrical connector 1. Further, all of the base end portion 51, the positioning portion 52, the small outer diameter portion 53 and the guide portion 54 have cylindrical shapes and are formed so as to be concentric to each other.

The base end portion 51 is a cylindrical portion located on the base side of the housing 5. The base end portion 51 has four ribs 511 formed on an outer peripheral surface of the base end portion 51 so as to extend in the Z direction and a tapered surface 512 formed on an inner peripheral surface of the base end portion 51. The four ribs 511 are formed on the outer peripheral surface of the base end portion 51 at equal angular intervals so as to protrude toward the outer side. The four ribs 511 contact with an inner peripheral surface of the outer contact 6 when the housing 5 is press-fitted into the outer contact 6. With this configuration, it is possible to ensure concentricity between the housing 5 and the outer contact 6 as well as prevent backlash of the housing 5 in the outer contact 6. Further, by ensuring the concentricity between the housing 5 and the outer contact 6, it is possible to improve the signal transmission characteristics of the electrical connector 1.

Although the four ribs 511 are formed at the equal angular intervals in the illustrated aspect, the number of ribs 511 is not limited thereto. Three, five or more ribs 511 may be formed at equal angular intervals. By forming at least three ribs 511, it is possible to provide the above-mentioned effect of ensuring the concentricity between the housing 5 and the outer contact 6 and the above-mentioned effect of preventing the backlash of the housing 5 in the outer contact 6.

The tapered surface 512 is formed on the inner peripheral surface of the base end portion 51. At a portion where the tapered surface 512 is formed, an inner diameter of the base end portion 51 gradually increases from the tip side toward the base side. When the contact pin 4 is press-fitted into the insertion hole 56 of the housing 5, the tapered portion 432 of the guide portion 43 of the contact pin 4 slides on the tapered surface 512, thereby guiding the press-fitting of the contact pin 4 into the insertion hole 56 of the housing 5.

The positioning portion 52 is formed for positioning the housing 5 in the outer contact 6. The positioning portion 52 is a cylindrical portion formed so as to protrude from the tip end portion of the base end portion 51 toward the tip side. The positioning portion 52 includes a tip tapered surface 521*a*, a base tapered surface 521*b*, a flat surface 522 located between the tip tapered surface 521*a* and the base tapered surface 521*b* and an inner tapered surface 523. The tip tapered surface 521*a*, the base tapered surface 521*b* and the flat surface 522 are formed on an outer peripheral surface of the positioning portion 52. The inner tapered surface 523 is formed on an inner peripheral surface of the positioning portion 52.

The tip tapered surface 521*a* is formed on an outer peripheral surface of a tip end portion of the positioning portion 52 so that a height of the tip tapered surface 521*a* gradually decreases from the tip side toward the base side. The base tapered surface 521*b* is formed on an outer peripheral surface of a base end portion of the positioning portion 52 so that a height of the base tapered surface 521*b* gradually increases from the tip side toward the base side. The flat surface 522 is a flat surface extending in the Z direction and located between the tip tapered surface 521*a* and the base tapered surface 521*b*. The tip tapered surface 521*a*, the base tapered surface 521*b* and the flat surface 522 formed on the positioning portion 52 define a concave portion for receiving an after-mentioned pair of housing fixing portions 623 (see FIG. 12) of the outer contact 6. After the housing 5 is press-fitted into the outer contact 6, the pair of housing fixing portions 623 of the outer contact 6 are bent toward the inner side so as to be engaged with the tip tapered surface 521*a*, the base tapered surface 521*b* and the flat surface 522 of the housing 5. With this configuration, it is possible to position the housing 5 in the outer contact 6 as well as prevent the housing 5 from being removed from the outer contact 6. Further, an outer diameter of the positioning portion 52 at each of top portions of the tip tapered surface 521*a* and the base tapered surface 521*b* is equal to an outer diameter of the base end portion 51. Thus, when the housing 5 is press-fitted into the outer contact 6, the top portions of the tip tapered surface 521*a* and the base tapered surface 521*b* contact with the inner peripheral surface of the outer contact 6.

The inner tapered surface 523 is formed on the inner peripheral surface of the base end portion of the positioning portion 52. At a portion where the inner tapered surface 523 is formed, an inner diameter of the positioning portion 52 gradually increases from the tip side toward the base side. When the contact pin 4 is press-fitted into the insertion hole 56 of the housing 5, the tapered portions 432 of the guide portion 43 of the contact pin 4 slide on the inner tapered surface 523. With this configuration, the press-fitting of the contact pin 4 into the insertion hole 56 of the housing 5 is guided. When the press-fitting of the contact pin 4 into the insertion hole 56 of the housing 5 is completed, the pair of positioning protrusions 423 of the contact pin 4 contact with the inner tapered surface 523. With this configuration, the press-fitting of the contact pin 4 into the insertion hole 56 of the housing 5 is regulated and the contact pin 4 is positioned in the housing 5.

The small outer diameter portion 53 is a cylindrical portion formed so as to extend from the tip end of the positioning portion 52 toward the tip side. The small outer diameter portion 53 includes an enlarged diameter portion 531 formed on an outer peripheral surface of the small outer diameter portion 53. The enlarged diameter portion 531 is a ring portion formed so as to protrude from the outer peripheral surface of the small outer diameter portion 53 toward the outer side. Outer diameters of the small outer diameter portion 53 and the enlarged diameter portion 531 are smaller than the outer diameters of the base end portion 51, the positioning portion 52, and the guide portion 54. Thus, when the housing 5 is press-fitted into the outer contact 6, the small outer diameter portion 53 and the enlarged diameter portion 531 face the outer contact 6 through a gap therebetween as shown in FIG. 15. Therefore, an air layer exists between the outer peripheral surface of the small outer diameter portion 53 and the inner peripheral surface of the outer contact 6 and between the outer peripheral surface of the enlarged diameter portion 531 and the inner peripheral surface of the outer contact 6.

As is well known, the signal transmission characteristics of the contact pin 4 held in the housing 5 and the outer contact 6 depend on a diameter of the contact pin 4, an outer diameter and a thickness of the housing 5, and an outer diameter and a thickness of the outer contact 6. Further, diameters of the contact pin 220 and the outer contact 230 of the mating connector 200 are defined by industry standards. Thus, a design freedom in the diameter of the contact pin 4 to be connected to the contact pin 220 of the mating connector 200 is very low. Further, design freedoms in the diameter and the thickness of the outer contact 6 to be connected to the outer contact 230 of the mating connector 200 are also very low. On the other hand, since the thickness of the housing 5 is excessively large with respect to the diameter of the contact pin 4 determined so as to correspond to the diameter of the contact pin 220 of the mating connector 200 defined by the industry standard, there is a problem that the signal transmission characteristic of the contact pin 4, in particular, the signal transmission characteristic of the contact pin 4 in the high-frequency band is deteriorated. In the electrical connector 1 of the present disclosure, the housing 5 includes the small outer diameter portion 53 and the thickness of the small outer diameter portion 53 is smaller than the thicknesses of the other portions. By providing such a small outer diameter portion 53 in the housing 5, it is possible to suppress the deterioration of the signal transmission characteristic of the contact pin 4, in particular, the deterioration of the signal transmission characteristic of the contact pin 4 in the high-frequency band.

The guide portion 54 is a cylindrical portion formed so as to extend from the tip end portion of the small outer diameter portion 53 toward the tip side. The guide portion 54 includes an outer tapered surface 541 formed on an outer peripheral surface of the guide portion 54 and an inner tapered surface 542 formed on an inner peripheral surface of the guide portion 54. The outer tapered surface 541 is formed on the outer peripheral surface of the guide portion 54 so that a height of the outer tapered surface 541 gradually increases from the tip side toward the base side. At a top portion of the outer tapered surface 541, an outer diameter of the guide portion 54 is equal to the outer diameter of the base end portion 51. Thus, when the housing 5 is press-fitted into the outer contact 6, the top portion of the outer tapered surface 541 contacts with the inner peripheral surface of the outer contact 6. The inner tapered surface 542 is formed on an inner peripheral surface of the guide portion 54 so that a diameter of the insertion hole 56 gradually decreases from the tip side toward the base side.

The pair of engagement holes 55 are through holes formed across the positioning portion 52 and the small outer diameter portion 53 and facing each other on the same line. The pair of engagement holes 55 are formed so as to pass through the housing 5 in the width direction (X direction) and be symmetrical to each other through a center of the housing 5. When the contact pin 4 is press-fitted into the insertion hole 56 of the housing 5, the pair of spring portions 422 of the contact pin 4 are respectively engaged with the engagement holes 55 of the housing 5. With this configuration, it is possible to prevent the contact pin 4 from being removed from the housing 5.

Next, the press-fitting of the contact pin 4 into the housing 5 will be described with reference to FIGS. 11*a*-11*c*. FIG. 11*a* is a XZ plane cross-sectional view of the contact pin 4 and the housing 5 at a beginning phase of the press-fitting of the contact pin 4 into the insertion hole 56 of the housing 5. FIG. 11*b* is a XZ plane cross-sectional view of the contact pin 4 and the housing 5 in a middle phase of the press-fitting of the contact pin 4 into the insertion hole 56 of the housing 5. FIG. 11*c* is a XZ plane cross-sectional view of the contact pin 4 and the housing 5 at an end phase of the press-fitting of the contact pin 4 into the insertion hole 56 of the housing 5.

As shown in FIG. 11*a*, in a state that the core wire 510 of the coaxial cable 500 is held in the holding portion 41 of the contact pin 4, the contact pin 4 is inserted into the insertion hole 56 of the housing 5 from the base side. As shown in FIG. 11*b*, as the contact pin 4 is press-fitted into the insertion hole 56 of the housing 5, the pair of spring portions 422 of the contact pin 4 are elastically deformed toward the inner side. As shown in FIG. 11*c*, when the contact pin 4 is further press-fitted into the insertion hole 56 of the housing 5, the pair of spring portions 422 of the contact pin 4 respectively reach the pair of engagement holes 55 of the housing 5 and elastically restore toward the outer side. When the pair of spring portions 422 of the contact pin 4 elastically restore toward the outer side, base end portions of the pair of spring portions 422 of the contact pin 4 are respectively engaged with the pair of engagement holes 55 of the housing 5. When the base end portions of the pair of spring portions 422 of the contact pin 4 are respectively engaged with the pair of engagement holes 55 of the housing 5, the press-fitting of the contact pins 4 into the insertion hole 56 of the housing 5 is completed. The elastic restoration of the pair of spring portions 422 of the contact pin 4 toward the outer side can provide the click feeling indicating that the press-fitting of the contact pin 4 into the insertion hole 56 of the housing 5 is completed. Further, since the base end portions of the pair of spring portions 422 of the contact pin 4 are respectively engaged with the pair of engagement holes 55 of the housing 5, it is possible to prevent the contact pin 4 from being removed from the housing 5.

Further, in the state that the press-fitting of the contact pin 4 into the insertion hole 56 of the housing 5 is completed, the pair of positioning protrusions 423 of the contact pin 4 abut against the inner tapered surface 523 formed on the inner peripheral surface of the positioning portion 52 of the housing 5 as shown in FIG. 4, and thereby the press-fitting of the contact pin 4 into the housing 5 is regulated. With this configuration, it is possible to position the contact pins 4 in the housing 5.

Referring back to FIG. 6, the outer contact 6 is a cylindrical member made of a metallic material. The outer contact 6 serves as an outer conductor layer covering the housing 5. As shown in FIGS. 12 and 13, the outer contact 6 includes a base end portion 61 to be located between the inner insulator layer 520 and the outer conductor layer 530 of the coaxial cable 500, a housing containing portion 62 extending from a tip end portion of the base end portion 61 toward the tip side and a tip end portion 63 extending from a tip end portion of the housing containing portion 62 toward the tip side. All of the base end portion 61, the housing containing portion 62 and the tip end portion 63 have cylindrical shapes and are formed so as to be concentric to each other.

The base end portion 61 is a cylindrical portion to be attached between the inner insulator layer 520 and the outer conductor layer 530 of the coaxial cable 500. The crimping member 8 is crimped onto the outer conductor layer 530 located on an outer peripheral surface of the base end portion 61. When the crimping member 8 is crimped onto the outer conductor layer 530, the outer conductor layer 530 is sandwiched between the outer peripheral surface of the base end portion 61 and the inner peripheral surface of the crimping member 8, and thereby the outer contact 6 is attached to the coaxial cable 500. The base end portion 61 includes a cylindrical body portion 611, four meshing ribs 612 formed on an outer peripheral surface of the body portion 611 so as to protrude toward the outer side and a tapered portion 613 for connecting the body portion 611 and the housing containing portion 62.

The body portion 611 is a cylindrical portion to be attached between the inner insulator layer 520 and the outer conductor layer 530 of the coaxial cable 500. Further, the body portion 611 has a function of containing the ring member 7 therein. Each of the four meshing ribs 612 is a convex portion formed on an outer peripheral surface of the body portion 611 so as to extend in a circumferential direction of the body portion 611. As shown in FIG. 6, each of the four meshing ribs 612 is formed so as to surround the outer peripheral surface of the body portion 611 except for an upper side (+Y direction side) portion of the outer peripheral surface of the body portion 611. The four meshing ribs 612 mesh with after-mentioned engagement recesses 814 (see FIG. 17) formed on the inner peripheral surface of the crimping member 8 for more firmly holding the outer conductor layer 530 of the coaxial cable 500 between the outer peripheral surface of the body portion 611 and the inner peripheral surface of the crimping member 8. With this configuration, it is possible to improve attachment strength of the outer contact 6 with respect to the coaxial cable 500 and thus prevent the outer contact 6 from being removed from the coaxial cable 500. The tapered portion 613 is inclined so that an inner diameter and an outer diameter of the tapered portion 613 gradually increase from the tip side toward the base side. The tapered portion 613 connects the body portion 611 of the base end portion 61 and the housing containing portion 62. Although the number of meshing ribs 612 formed on the outer peripheral surface of the body portion 611 is four in the illustrated aspect, the present disclosure is not limited thereto. If at least one meshing rib 612 is formed on the outer peripheral surface of the body portion 611 and engaged with the corresponding meshing recess 814 of the crimping member 8, it is possible to more firmly hold the outer conductor layer 530 of the coaxial cable 500 between the outer peripheral surface of the body portion 611 and the inner peripheral surface of the crimping member 8.

The housing containing portion 62 is a cylindrical portion extending from a tip end portion of the tapered portion 613 of the base end portion 61 toward the tip side. The housing containing portion 62 has a function of containing the housing 5 therein. The housing containing portion 62 has a cylindrical body portion 621, four engagement portions 622 protruding from an outer peripheral surface of the body portion 621 toward the outer side, the pair of housing fixing portions 623 for fixing the housing 5 in the housing containing portion 62, four spring portions 624 formed at a tip end portion of the housing containing portion 62, contact portions 625 respectively formed on tip end portions of the four spring portions 624 and to be in contact with the outer contact 230 of the mating connector 200 and a tapered portion 626 for connecting the housing containing portion 62 and the tip end portion 63.

The body portion 621 is a cylindrical portion for covering the housing 5. An outer diameter and an inner diameter of the body portion 621 are respectively smaller than the outer diameter and the inner diameter of the body portion 611. Each of the four engagement portions 622 is a tapered portion formed so as to protrude from the outer peripheral surface of the main body portion 621 toward the outer side. The four engagement portions 622 are formed on the outer peripheral surface of the body portion 621 at equal angular intervals. Since all of the four engagement portions 622 have the same structure, a structure of one engagement portion 622 will be described below in detail as a representative. The engagement portion 622 has a tapered tip end surface whose height gradually increases from the tip side toward the base side and a flat base end surface perpendicular to an extending direction of the body portion 621 (the Z direction). The engagement portions 622 are respectively engaged with after-mentioned engagement portions 212 (see FIGS. 19 and 20) of the cover 2 for preventing the outer contact 6 from being removed from the cover 2. As described above, in the electrical connector 1 of the present disclosure, the four engagement portions 622 to be respectively engaged with the engagement portions 212 are formed on the outer peripheral surface of the outer contact 6 for preventing the outer contact 6 from being removed from the cover 2.

Although the four engagement portions 622 are formed at the equal angular intervals so as to protrude from the outer peripheral surface of the body portion 621 toward the outer side in the illustrated aspect, the number of engagement portions 622 formed at equal angular intervals so as to protrude from the outer peripheral surface of the body portion 621 toward the outer side is not limited thereto. Three, five or more engagement portions 622 may be formed at equal angular intervals so as to protrude from the outer peripheral surface of the body portion 621 toward the outer side. By forming at least three engagement portions 622 at equal angular intervals so as to protrude from the outer peripheral surface of the body portion 621 toward the outer side, it is possible to prevent the outer contact 6 from being removed from the cover 2.

Conventionally, it has been widely practiced to attach a ring-shaped engagement member to the outer peripheral surface of the outer contact 6 for preventing the outer contact 6 from being removed from the cover 2 due to the engagement between the engagement member and the cover 2. Compared to such a case, since the four engagement portions 622 are integrated with the body portion 621 in the electrical connector 1 of the present disclosure, the number of parts and the number of assembly steps of the electrical connector 1 can be reduced.

The pair of housing fixing portions 623 have a function of fixing the housing 5 in the housing containing portion 62 when the pair of housing fixing portions 623 are bent toward the inner side to engage with the positioning portion 52 of the housing 5. Each of the pair of housing fixing portions 623 is a plate-like portion formed by cutting out a part of the outer peripheral surface of the body portion 621. One end portion of each of the pair of housing fixing portions 623 is a fixed end integrated with the outer peripheral surface of the body portion 621. Another end portion of each of the pair of housing fixing portions 623 is a free end. In a state that the housing 5 is contained in the body portion 621 of the housing, the pair of housing fixing portions 623 are bent toward the inner side. By such an operation, the other end portions of the pair of housing fixing portions 623 engage with the tip tapered surface 521*a*, the base tapered surface 521*b* and the flat surface 522 of the positioning portion 52 of the housing 5 as shown in FIG. 15. As a result, it is possible to fix the housing 5 in the body portion 621 of the housing.

Each of the four spring portions 624 is a plate-like portion formed by cutting out a part of the outer peripheral surface of the body portion 621. The four spring portions 624 are formed on the outer peripheral surface of the body portion 621 at equal angular intervals. The four spring portions 624 are formed for reducing force required to engage the outer contact 6 with the corresponding outer contact 230 of the mating connector 200. Since all of the four spring portions 624 have the same structure, a structure of one spring portion 624 will be described below in detail as a representative. The spring portion 624 has one end portion integrated with the body portion 621 and serving as a fixed end and another end portion serving as a free end. The other end of the spring portion 624 is curved toward the inner side.

The contact portions 625 are portions to be in contact with the corresponding outer contact 230 of the mating connector 200. The contact portions 625 are respectively formed on the outer peripheral surfaces of the other end portions (the free ends) of the four spring portions 624 so as to protrude toward the outer side. When the electrical connector 1 is coupled with the mating connector 200, the four contact portions 625 contact with the corresponding outer contact 230 of the mating connector 200. At this time, since the four spring portions 624 are elastically deformed toward the inner side, it is possible to reduce the force required to engage the outer contact 6 with the corresponding outer contact 230 of the mating connector 200.

Although all of the four spring portions 624 are formed on the outer peripheral surface of the body portion 621 with postures that the fixed ends are located on the base side and the free ends are located on the tip side in the illustrated aspect, the present disclosure is not limited thereto. For example, as shown in FIG. 14, the four spring portions 624 may be formed on the body portion 621 so that the directions of the four spring portions 624 are alternated. Namely, two of the spring portions 624 may be formed on the body portion 621 so that the fixed ends of the two spring portions 624 are located on the base side and the free ends of the two spring portions 624 are located on the tip side. Further, remaining two of the spring portions 624 may formed on the body portion 621 so that the free ends of the remaining two spring portions 624 are located at the base side and the fixed ends of the remaining two spring portions 624 are located on the tip side. The two spring portions 624 and the remaining two spring portions 624 may be alternately aligned along a circumferential direction of the body portion 621. In this case, a contact area between the outer contact 6 and the corresponding outer contact 230 of the mating connector 200 at a portion of the body portion 621 where the four spring portions 624 are formed increases. Thus, it is possible to stabilize the signal transmission characteristic of the electrical connector 1. In addition, since positions of the contact portions 625 to be in contact with the corresponding outer contact 230 of the mating connector 200 are dispersed in the insertion and extraction direction of the electrical connector 1 (the Z direction), it is possible to further reduce the force required to engage the outer contact 6 with the corresponding outer contact 230 of the mating connector 200. The scope of the present disclosure also involves such an aspect described above.

Although the four spring portions 624 are formed on the outer peripheral surface of the body portion 621 at the equal angular intervals in the illustrated aspect, the number of spring portions 624 formed on the outer peripheral surface of the body portion 621 at equal angular intervals is not limited thereto. Three, five or more spring portions 624 may be formed on the outer peripheral surface of the body portion 621 at equal angular intervals. By forming at least three spring portions 624 on the outer peripheral surface of the body portion 621 at equal angular intervals, it is possible to reduce the force required to engage the outer contact 6 with the corresponding outer contact 230 of the mating connector 200.

The tapered portion 626 is inclined so that an inner diameter and an outer diameter of the tapered portion 626 gradually increase from the tip side toward the base side. The tapered portion 626 connects the body portion 621 of the housing containing portion 62 and the tip end portion 63. The tapered portion 626 serves as a guide for press-fitting the outer contact 6 into the cover 2. Further, when the electrical connector 1 is coupled with the mating connector 200, the corresponding outer contact 230 of the mating connector 200 slides on the tapered portion 626. Thus, the tapered portion 626 also serves as a guide for coupling the electrical connector 1 with the mating connector 200.

The tip end portion 63 is a cylindrical portion extending from a tip end portion of the tapered portion 626 of the housing containing portion 62 toward the tip side. An outer diameter and an inner diameter of the tip end portion 63 are respectively smaller than the outer diameter and the inner diameter of the body portion 621 of the housing. Thus, when the electrical connector 1 is coupled with the mating connector 200, a separation distance between the tip end portion 63 and the contact pin 220 of the mating connector 200 is smaller than a separation distance between the body portion 621 of the housing and the contact pin 220. Since a separation distance between the contact pin 220 and the outer contact 6 serving as the ground electrode becomes small at the position where the tip end portion 63 faces the contact pin 220, it is possible to improve the signal transmission characteristic of the electrical connector 1 when the electrical connector 1 is coupled with the mating connector 200.

Referring back to FIG. 6, the ring member 7 is a ring-shaped member made of a rigid insulating material. The ring member 7 is contained in the base end portion 61 of the outer contact 6. The ring member 7 has a function of supporting the base end portion 61 from the inner side for preventing the outer contact 6 from being deformed when the crimping member 8 is crimped onto the outer conductor layer 530 of the coaxial cable 500 located on the base end portion 61. Since the ring member 7 can prevent the deformation of the outer contact 6 when the crimping member 8 is crimped onto the outer conductor layer 530 of the coaxial cable 500, it is possible to prevent deterioration of the signal transmission characteristics of the electrical connector 1.

The ring member 7 includes four protruding pieces 71 protruding from an outer peripheral surface of the ring member 7 toward the outer side. The four protruding pieces 71 are formed on the outer peripheral surface of the ring member 7 at equal angular intervals. Each of the four protruding pieces 71 is a plate-like portion having a tip end portion which is a fixed end integrated with the outer peripheral surface of the ring member 7 and a base end portion protruding from the outer peripheral surface of the ring member 7 toward the outer side. When the ring member 7 is contained in the body portion 611 of the base end portion 61 of the outer contact 6, the base end portions of the four protruding pieces 71 are engaged with an inner peripheral surface of the body portion 611. With this configuration, it is possible to fix the ring member 7 in the body portion 611.

Further, although the four protruding pieces 71 are formed on the outer peripheral surface of the ring member 7 at the equal angular intervals in the illustrated aspect, the number of protruding pieces 71 formed on the outer peripheral surface of the ring member 7 at equal angular intervals is not limited thereto. Three, five or more protruding pieces 71 may be formed on the outer peripheral surface of the ring member 7 at equal angular intervals. By forming at least three protruding pieces 71 on the outer peripheral surface of the ring member 7 at equal angular intervals, it is possible to fix the ring member 7 in the body portion 611 of the base end portion 61 of the outer contact 6.

Further, when the outer contact 6 is attached to the coaxial cable 500, the inner insulator layer 520 of the coaxial cable 500 is held in the ring member 7 (see FIG. 18). Thus, by appropriately changing a thickness of the ring member 7, it becomes possible to attach the outer contact 6 to any one of various kinds of the coaxial cable 500 having various diameters.

FIG. 15 shows a YZ plane cross-sectional view of the outer contact 6, the housing 5 and the ring member 7 in a state that the housing 5 and the ring member 7 are contained in the outer contact 6. As shown in FIG. 15, the housing 5 and the ring member 7 are contained in the outer contact 6 so as to be concentric with the outer contact 6. More specifically, the housing 5 is contained in the body portion 621 of the housing containing portion 62 of the outer contact 6. Further, the ring member 7 is contained in the body portion 611 of the base end portion 61 of the outer contact 6.

At this time, the four ribs 511 formed on the outer peripheral surface of the base end portion 51 of the housing 5 contact with the inner peripheral surface of the body portion 621 of the housing containing portion 62 of the outer contact 6. With this configuration, it is possible to ensure the concentricity between the outer contact 6 and the housing 5 as well as prevent the backlash of the housing 5 in the body portion 621. Further, by ensuring the concentricity between the outer contact 6 and the housing 5, it is possible to improve the signal transmission characteristics of the electrical connector 1.

Further, the housing fixing portion 623 of the outer contact 6 engages with the tip tapered surface 521*a*, the base tapered surface 521*b* and the flat surface 522 of the positioning portion 52 of the housing 5. With this configuration, it is possible to fix the housing 5 in the body portion 621 of the housing containing portion 62. Further, the base end portions of the four protruding pieces 71 of the ring member 7 contact with the inner peripheral surface of the body portion 611 of the base end portion 61 of the outer contact 6. With this configuration, it is possible to fix the ring member 7 in the body portion 611.

Referring back to FIG. 6, the crimping member 8 is a member for attaching the outer contact 6 to the coaxial cable 500. The crimping member 8 is formed as another member separated from the outer contact 6. The crimping member 8 has a first crimping portion 81 to be crimped onto the outer conductor layer 530 of the coaxial cable 500 so as to surround the outer conductor layer 530, a second crimping portion 82 to be crimped onto the outer insulator layer 540 of the coaxial cable 500 so as to surround the outer insulator layer 540 and a connecting portion 83 for connecting the first crimping portion 81 and the second crimping portion 82.

The first crimping portion 81 includes a pair of plate-like portions 811*a*, 811*b* connected to each other at one end portions thereof, an engagement concave portion 812 formed on the plate-like portion 811*a*, an engagement convex portion 813 formed on the plate-like portion 811*b* and the four meshing concave portions 814 (see FIG. 17) formed on inner surfaces of the pair of plate-like portions 811*a*, 811*b*. The pair of plate-like portions 811*a*, 811*b* are portions closed so as to surround the outer conductor layer 530 of the coaxial cable 500 by a swaging process. The pair of plate-like portions 811*a*, 811*b* are swaged so as to surround the outer conductor layer 530 and thus the first crimping portion 81 is formed into a cylindrical shape. At this time, the engagement concave portion 812 formed in the plate-like portion 811*a* is engaged with the engagement convex portion 813 formed in the plate-like portion 811*b*. As shown in FIG. 6, the engagement concave portion 812 has a shape whose width gradually increases as it is separated from another end portion of the plate-like portion 811*a*. On the other hand, the engagement convex portion 813 has a shape whose width gradually decreases as it is separated from another end portion of the plate-like portion 811*b* so as to correspond to the shape of the engagement concave portion 812. Thus, even if external force is applied to the first crimping portion 81 so as to open the pair of plate-like portions 811*a*, 811*b*, the engagement between the engagement concave portion 812 and the engagement convex portion 813 can present the pair of plate-like portions 811*a*, 811*b* from being opened. By preventing the pair of plate-like portions 811*a*, 811*b* from being opened by the engagement between the engagement concave portion 812 and the engagement convex portion 813, it is possible to improve tensile strength of the attachment of the outer contact 6 with respect to the coaxial cable 500.

In this regard, the aspects of the engagement concave portion 812 and the engagement convex portion 813 are not limited to the illustrated aspects as long as the engagement between the engagement concave portion 812 and the engagement convex portion 813 can prevent the pair of plate-like portions 811*a*, 811*b* from being opened. For example, the scope of the present disclosure also involves an aspect shown in FIG. 16. In the aspect shown in FIG. 16, a plurality of engagement concave portions 812 are formed on both side surfaces of the plate-like portion 811*a* and a plurality of engagement convex portions 812 respectively corresponding to the plurality of engagement concave portions 812 are formed on inner side surfaces of the plate-like portion 811*b*. The plurality of engagement concave portions 812 are respectively engaged with the plurality of engagement convex portions 813, and thereby it is possible to prevent the pair of plate-like portions 811*a*, 811*b* from being opened.

As shown in FIG. 17, each of the four meshing concave portions 814 is a concave portion formed on the inner peripheral surfaces of the pair of plate-like portions 811*a*, 811*b* so as to extend along a circumferential direction of the plate-like portions 811*a*, 811*b*. When the pair of plate-like portions 811*a*, 811*b* are closed so as to surround the outer conductor layer 530 of the coaxial cable 500 located on the outer peripheral surface of the body portion 611 of the base end portion 61 of the outer contact 6, the plurality of meshing concave portions 814 respectively mesh with the four meshing ribs 612 formed on the outer peripheral surface of the body portion 611. With this configuration, it is possible to more firmly hold the outer conductor layer 530 of the coaxial cable 500 between the outer contact 6 and the crimping member 8. Although the number of meshing concave portions 814 formed on the inner peripheral surfaces of the pair of plate-like portions 811*a*, 811*b* is four in the illustrated aspect, the present disclosure is not limited thereto. If at least one meshing concave portion 814 is formed on the inner peripheral surfaces of the pair of plate-like portions 811*a*, 811*b* and the at least one meshing concave portion 814 meshes with the corresponding meshing rib 612 of the outer contact 6, it is possible to more firmly hold the outer conductor layer 530 of the coaxial cable 500 between the outer contact 6 and the crimping member 8.

Referring back to FIG. 6, the second crimping portion 82 includes a pair of plate-like portions 821*a*, 821*b* connected to each other at one end portions thereof. The pair of plate-like portions 821*a*, 821*b* are portions to be closed so as to surround the outer insulator layer 540 of the coaxial cable 500 by a swaging process. A bottom portion of the first crimping portion 81 is connected to a bottom portion of the second crimping portion 82 by the connecting portion 83.

The connector assembly 10 including the components described above should be attached to the coaxial cable 500 by the following exemplary procedure. First, a stripping process is subjected to the coaxial cable 500 for exposing the core wire 510 and the outer conductor layer 530 at the end portion of the coaxial cable 500 by respective required lengths. Next, the core wire 510 of the coaxial cable 500 exposed by the stripping process is placed onto the bottom plate 411 of the holding portion 41 of the contact pin 4. As described above, in a state before the contact pin 4 is connected to the core wire 510, the pair of wall portions 412 linearly extend from the bottom plate 411 toward the upper side. Thus, by using the suitable tool such as crimp pliers, the tip end portions of the pair of wall portions 412 linearly extending from the bottom plate 411 toward the upper side are bend so as to contact with the core wire 510 and press the core wire 510 onto the bottom plate 411. As a result, the contact pin 4 is crimped onto the core wire 510.

Next, the housing 5 is press-fitted into the outer contact 6 from the base side for containing the housing 5 in the housing containing portion 62 of the outer contact 6. Next, the pair of housing fixing portions 623 of the outer contact 6 are bent toward the inner side to engage the pair of housing fixing portions 623 with the tip tapered surface 521*a*, the base tapered surface 521*b* and the flat surface 522 of the positioning portion 52 of the housing 5. As a result, the housing 5 is fixed in the housing containing portion 62 of the outer contact 6. Next, the ring member 7 is press-fitted into the outer contact 6 from the base side for containing the ring member 7 in the base end portion 61 of the outer contact 6.

Next, the element wires of the exposed outer conductor layer (braided layer) 530 of the coaxial cable 500 are unwoven to open the outer conductor layer 530 toward the outer side for exposing the inner insulator layer 520 toward the outer side by a required length. Next, the coaxial cable 500 and the contact pin 4 are inserted into the ring member 7 from the base side so that the exposed inner insulator layer 520 is covered by the ring member 7. Next, the contact pin 4 is press-fitted into the insertion hole 56 of the housing 5 from the base side. The press-fitting of the contact pin 4 into the insertion hole 56 is completed when the click feeling is provided by the elastic restoration of the pair of spring portions 422 of the contact pin 4. Next, the element wires of the outer conductor layer 530 of the coaxial cable 500 which are opened toward the outside are returned to straight for covering the outer peripheral surface of the body portion 611 of the base end portion 61 of the outer contact 6 with the outer conductor layer 530.

Next, as shown in FIG. 17, a suitable jig is used for closing the pair of plate-like portions 811*a*, 811*b* of the first crimping portion 81 of the crimping member 8 so as to surround the outer conductor layer 530 of the coaxial cable 500 located on the body portion 611 of the base end portion 61 of the outer contact 6 (see arrows indicated by dotted lines in FIG. 17). With this operation, the engagement concave portion 812 and the engagement convex portion 813 of the first crimping portion 81 are engaged with each other. As a result, the first crimping portion 81 of the crimping member 8 is crimped onto the outer conductor layer 530 of the coaxial cable 500 located on the body portion 611 of the base end portion 61 of the outer contact 6. Next, the suitable jig is used for closing the pair of plate-like portions 821*a*, 821*b* of the second crimping portion 82 of the crimping member 8 so as to surround the outer insulator layer 540 of the coaxial cable 500 (see arrows indicated by dotted lines in FIG. 17). With this operation, the second crimping portion 82 of the crimping member 8 is crimped onto the outer insulator layer 540 of the coaxial cable 500. When the first crimping portion 81 of the crimp member 8 is crimped onto the outer conductor layer 530 of the coaxial cable 500 and the second crimping portion 82 of the crimp member 8 is crimped onto the outer insulator layer 540 of the coaxial cable 500, the outer contact 6 is attached to the coaxial cable 500 and the attachment of the coaxial cable 500 of the connector assembly 10 with respect to the coaxial cable 500 is completed. The connector assembly 10 can be attached to the coaxial cable 500 due to the above-mentioned procedure. It is noted that the above-mentioned procedure is merely one exemplarity procedure for attaching the connector assembly 10 to the coaxial cable 500 and thus the connector assembly 10 can be attached to the coaxial cable 500 by an arbitrary suitable procedure.

FIG. 18 is a YZ plane cross-sectional view of the connector assembly 10 and the coaxial cable 500 in the state that the connector assembly 10 is attached to the coaxial cable 500. As shown in FIG. 18, the base end portion 61 of the outer contact 6 is located between the inner insulator layer 520 and the outer conductor layer 530 of the coaxial cable 500. Further, the ring member 7 is located between the base end portion 61 and the inner insulator layer 520. Thus, the pressure applied at the time of crimping the first crimping portion 81 of the crimping member 8 onto the outer conductor layer 530 of the coaxial cable 500 is received by the base end portion 61 and thereby the pressure is not transmitted to the core 510 of the coaxial cable 500. Therefore, it is possible to prevent the core wire 510 from being deformed by the pressure applied at the time of crimping the first crimping portion 81 onto the coaxial cable 500, thereby preventing the deterioration of the signal transmission characteristics of the coaxial cable 500.

Further, the ring member 7 supports the base end portion 61 of the outer contact 6 from the inner side when the first crimping portion 81 of the crimping member 8 is crimped onto the outer conductor layer 530 of the coaxial cable 500. Thus, it is possible to prevent the base end portion 61 from being deformed by the pressure at the time of crimping the first crimping portion 81 onto the coaxial cable 500. As a result, it is possible to prevent the deterioration of the signal transmission characteristics of the electrical connector 1.

The above-mentioned connector assemblies 10 are respectively attached to the four coaxial cables 500 and held by the cover 2. Referring back to FIG. 5, the cover 2 is made of an insulating material such as a resin material. The cover 2 has a function of holding the four coaxial cables 500 to which the connector assemblies 10 are respectively attached. As shown in FIGS. 19 and 20, the cover 2 includes a box-shaped base end portion 21, a tubular portion 22 protruding from the base end portion 21 toward the tip side, the four insertion holes 23 passing through the base end portion 21 and the tubular portion 22 in the insertion and extraction direction of the electrical connector 1 (the Z direction), an arch portion 24 formed on an upper surface of the base end portion 21 and a lever portion 25 formed on an upper surface of the tubular portion 22 so as to extend toward the base side.

The base end portion 21 includes an insertion hole 211 which is formed in each of lateral surfaces of the base end portion 21 and into which the fixing member 3 (see FIG. 5) should be inserted and a pair of engagement portions 212 which are respectively formed on each of the lateral surfaces of the base end portion 21 and should be respectively engaged with the engagement portions 622 of the outer contacts 6. The insertion hole 211 is formed so as to pass through the lateral surface of the base end portion 21 in the width direction (the X direction). The shape of the insertion hole 211 corresponds to the shape of the fixing member 3 and thus the fixing member 3 can be inserted into the insertion hole 211.

Each of the pair of engagement portions 212 is a plate-like portion whose base end portion is integrated with the base end portion 21 and whose tip end surface is a flat surface perpendicular to the Z direction. As shown in FIG. 21, when the four coaxial cables 500 to which the connector assemblies 10 are respectively attached are press-fitted into the four insertion holes 23 of the cover 2, the base end surface of outer one of the engagement portions 622 formed on the outer peripheral surface of the housing containing portion 62 of each outer contact 6 is engaged with the tip end surface of the engagement portion 212. With this configuration, it is possible to prevent the four coaxial cables 500 to which the connector assemblies 10 are respectively attached from being removed from the cover 2.

Further, by respectively inserting the pair of fixing members 3 into the insertion holes 211 formed on the lateral surfaces of the base end portion 21 in this state, the four coaxial cables 500 to which the connector assemblies 10 are respectively attached can be fixed in the cover 2. As shown in FIG. 5, each of the pair of fixing members 3 has an upper extending portion 31*a*, a central extending portion 31*b*, a lower extending portion 31*c* and an engagement protrusion 32 formed more to the tip side (the +Z direction side) than the central extending portion 31*b* so as to extend toward the inner side of the cover 2. The upper extending portion 31*a*, the central extending portion 31*b* and the lower extending portion 31*c* extend toward the inner side of the cover 2 with being spaced apart from each other. When the fixing members 3 are respectively inserted into the insertion holes 211 respectively formed in the lateral surfaces of the base end portion 21 of the cover 2, the engagement protrusions 32 are engaged with an inner surface of the base end portion 21, and thereby the fixing members 3 are fixed with respect to the cover 2.

Further, as shown in FIG. 4, the body portions 621 of the housing containing portions 62 of the outer contacts 6 respectively attached to the coaxial cables 500 are respectively held between the upper extending portion 31*a* and the central extending portion 31*b* of the fixing member 3 and between the central extending portion 31*b* and the lower extending portion 31*c* of the fixing member 3. Further, the base end surfaces of the engagement portions 622 of the outer contact 6 held between the upper extending portion 31*a* and the central extending portion 31*b* are respectively engaged with tip end surfaces (+Z direction end surfaces) of the upper extending portion 31*a* and the central extending portion 31*b*. Similarly, the base end surfaces of the engagement portions 622 of the outer contact 6 held between the central extending portion 31*b* and the lower extending portion 31*c* are respectively engaged with the tip end surfaces (the +Z direction end surfaces) of the central extending portion 31*b* and the lower extending portion 31*c*. With this configuration, it is possible to more reliably prevent the four coaxial cables 500 to which the connector assemblies 10 are respectively attached from being removed from the cover 2.

Referring back to FIGS. 19 and 20, the tubular portion 22 has a function of guiding the insertion of the electrical connector 1 with respect to the mating connector 200. Specifically, as shown in FIG. 23, when the electrical connector 1 is inserted into the mating connector 200, the four outer contacts 230 of the mating connector 200 respectively slide on inner peripheral surfaces of the four insertion holes 23 formed in the tubular portion 22 for guiding engagement between the four outer contacts 6 of the electrical connector 1 and the corresponding outer contacts 230 of the mating connector 200.

The arch portion 24 is an arch-shaped portion formed so as to protrude from the upper surface of the base end portion 21 toward the upper side. The lever portion 25 includes a positioning protrusion 251 protruding from a tip side portion of the upper surface of the tubular portion 22 toward the upper side, a lever portion 252 extending from an upper end portion of the positioning protrusion 251 toward the base side and an engagement concave portion 253 formed on an upper surface of the lever portion 252. The positioning protrusion 251 is formed so as to protrude from the upper surface of the base end portion 21 toward the upper side. By inserting the electrical connector 1 into the mating connector 200 so that the positioning protrusion 251 of the cover 2 of the electrical connector 1 is passed through an opening 240 (see FIG. 2) formed at an upper portion of the cover 210 of the mating connector 200, it is possible to position the electrical connector 1 with respect to the mating connector 200.

The lever portion 252 extends from the base end surface of the positioning protrusion 251 toward the base side and passes through an arch of the arch portion 24 so as to protrude more to the base side than the arch portion 24. The lever portion 252 faces the upper surfaces of the base end portion 21 and the tubular portion 22 through a gap therebetween. One end portion of the lever portion 252 is a fixed end integrated with the positioning protrusion 251 and another end portion of the lever portion 252 is a free end. The engagement concave portion 253 is formed on the upper surface of the lever portion 252. When the electrical connector 1 is coupled with the mating connector 200, the engagement concave portion 253 is engaged with the opening 240 of the cover 210 of the mating connector 200, and thereby the electrical connector 1 is locked with respect to the mating connector 200.

The lock of the electrical connector 1 with respect to the mating connector 200 will be described with reference to FIGS. 22*a* to 22*c*. FIG. 22*a* shows a state of the lever portion 252 at a beginning phase of the coupling of the electrical connector 1 with respect to the mating connector 200. FIG. 22*b* shows a state of the lever portion 252 at a middle phase of the coupling of the electrical connector 1 with respect to the mating connector 200. FIG. 22*c* shows a state of the lever portion 252 at an end phase of the coupling of the electrical connector 1 with respect to the mating connector 200.

As shown in FIG. 22*a*, the electrical connector 1 is inserted into the mating connector 200 so that the positioning protrusion 251 of the cover 2 of the electrical connector 1 is passed through the opening 240 of the cover 210 of the mating connector 200. As shown in FIG. 22*b*, when the electrical connector 1 is inserted into the mating connector 200, the lever portion 252 of the cover 2 of the electrical connector 1 contacts with an inner upper surface of the opening 240 and is elastically deformed toward the lower side. After that, as shown in FIG. 22*c*, when the coupling between the electrical connector 1 and the mating connector 200 is completed, the lever portion 252 is elastically restored toward the upper side and thus the engagement concave portion 253 is engaged with the inner upper surface of the opening 240. As a result, the electrical connector 1 is locked with respect to the mating connector 200. On the other hand, when the electrical connector 1 is removed from the mating connector 200, the lever portion 252 is elastically deformed toward the lower side to release the lock of the electrical connector 1 with respect to the mating connector 200. After that, the electrical connector 1 can be removed from the mating connector 200 by pulling the electrical connector 1 so as to get away from the mating connector 200.

In this regard, the lever portion 252 faces the upper surfaces of the base end portion 21 and the tubular portion 22 through the gaps therebetween and the other end portion of the lever portion 252 is the free end as described above. Thus, there is a problem that the other end portion of the lever portion 252 is drooped down by shrinkage of the constituent material of the cover 2 at the time of molding of the cover 2 and thus the lock of the electrical connector 1 with respect to the mating connector 200 becomes loose. In this regard, such a deformation of a molded article due to shrinkage of a constituent material after a molding process is called "molding deformation". The cover 2 of the present disclosure is obtained by a procedure improved for preventing the lever portion 252 from being drooped down by the molding deformation. Specifically, at the time of molding the cover 2, the lever portion 252 is molded integrally with the arch portion 24 located on the upper side of the lever portion 252. After the molding of the cover 2 is completed and a possibility of the molding deformation is sufficiently reduced when the constituent material of the cover 2 is sufficiently cooled and solidified, a connecting portion between the lever portion 252 and the arch portion 24 is cut to separate the lever portion 252 from the arch portion 24. By obtaining the cover 2 by the above-described procedure, it is possible to prevent the lever portion 252 from being drooped down by the above-mentioned molding deformation.

FIG. 23 shows a YZ plane cross-sectional view of the electrical connector 1 and the mating connector 200 in a state that the electrical connector 1 is coupled with the mating connector 200. As shown in FIG. 23, when the electrical connector 1 is coupled with the mating connector 200, the corresponding contact pins 220 of the mating connector 200 are respectively inserted into the cylindrical portions 42 of the contact pins 4 of the electrical connector 1 and thus the contact pins 4 are electrically connected to the corresponding contact pins 220 of the mating connector 200. Similarly, the tip end portions 63 and the housing containing portions 62 of the outer contacts 6 of the electrical connector 1 are respectively inserted into the corresponding outer contacts 230 of the mating connector 200 and the outer contacts 6 respectively contact with the inner peripheral surfaces of the corresponding outer contacts 230. As a result, the outer contacts 6 of the electrical connector 1 are electrically connected to the corresponding outer contacts 230 of the mating connector 200, and thereby the electrical potentials of the outer contacts 6 are respectively equal to the electrical potentials of the corresponding outer contacts 230.

As described above, the electrical connector 1 of the present disclosure is configured so that the body portion 611 of the base end portion 61 of the outer contact 6 is located between the inner insulator layer 520 and the outer conductor layer 530 of the coaxial cable 500 and the first crimping portion 81 of the crimp member 8 is crimped onto the outer conductor layer 530 located on the body portion 611 for attaching the outer contact 6 to the coaxial cable 500. Thus, the pressure applied at the time of crimping for attaching the outer contact 6 to the coaxial cable 500 is received by the outer contact 6 and thus is not transmitted to the core wire 510 of the coaxial cable 500. Therefore, it is possible to prevent the core wire 510 from being deformed by the pressure at the time of crimping the first crimping portion 81 onto the coaxial cable 500, thereby preventing the deterioration of the signal transmission characteristics of the coaxial cable 500.

Figure 24:
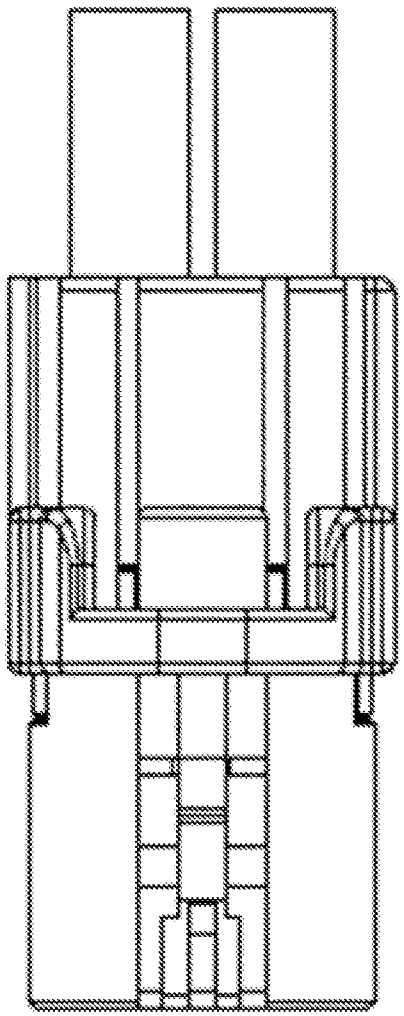
FIG. 24 is a top view of the electrical connector according to the first embodiment of the present disclosure and the coaxial cables attached to the electrical connector.
Figure 25:
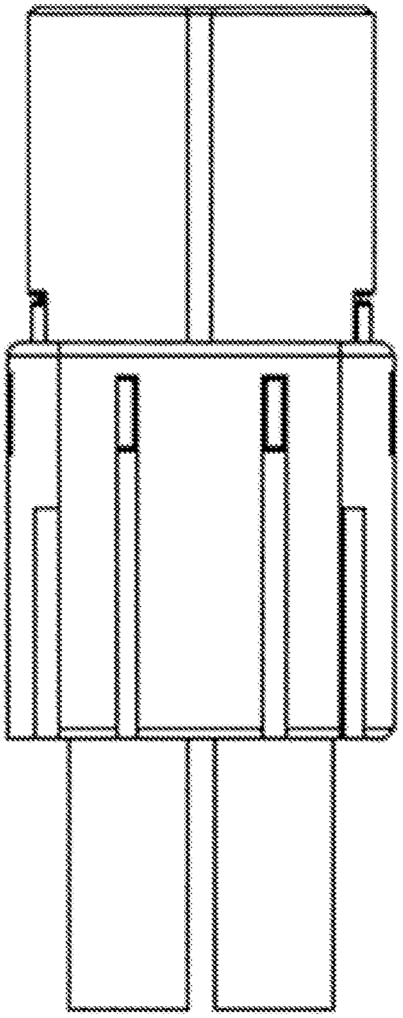
FIG. 25 is a bottom view of the electrical connector according to the first embodiment of the present disclosure and the coaxial cables attached to the electrical connector.
Figure 26:
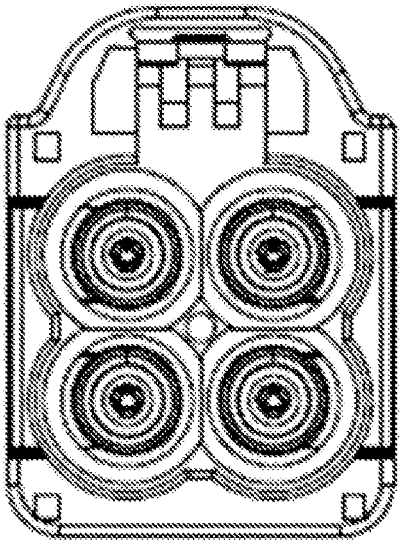
FIG. 26 is a front view of the electrical connector according to the first embodiment of the present disclosure and the coaxial cables attached to the electrical connector.
Figure 27:
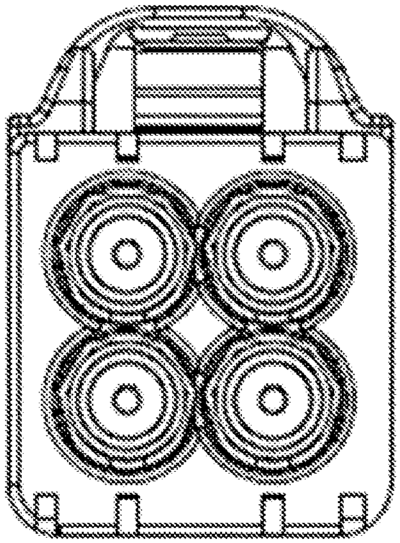
FIG. 27 is a rear view of the electrical connector according to the first embodiment of the present disclosure and the coaxial cables attached to the electrical connector.
Figure 28:
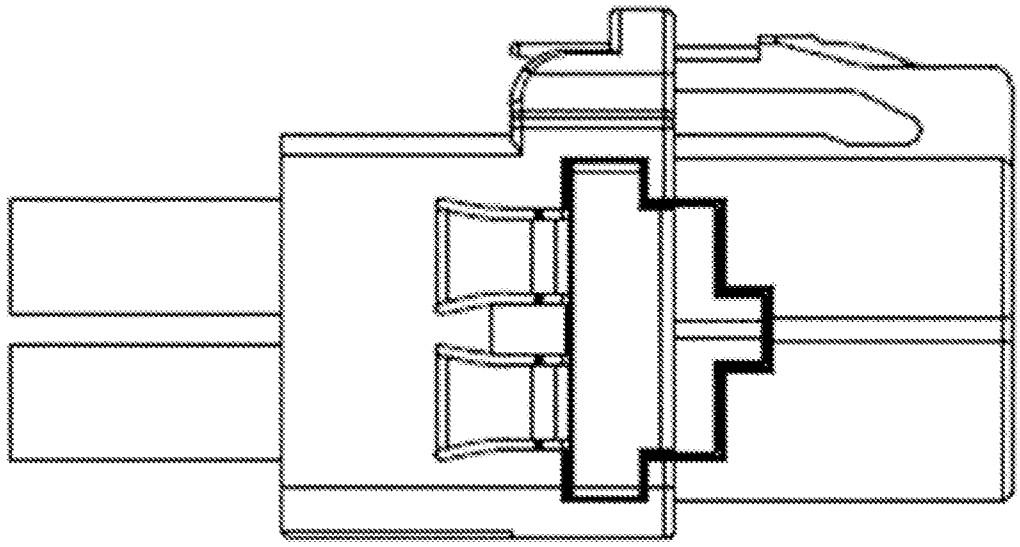
FIG. 28 is a left side view of the electrical connector according to the first embodiment of the present disclosure and the coaxial cables attached to the electrical connector.
Figure 29:
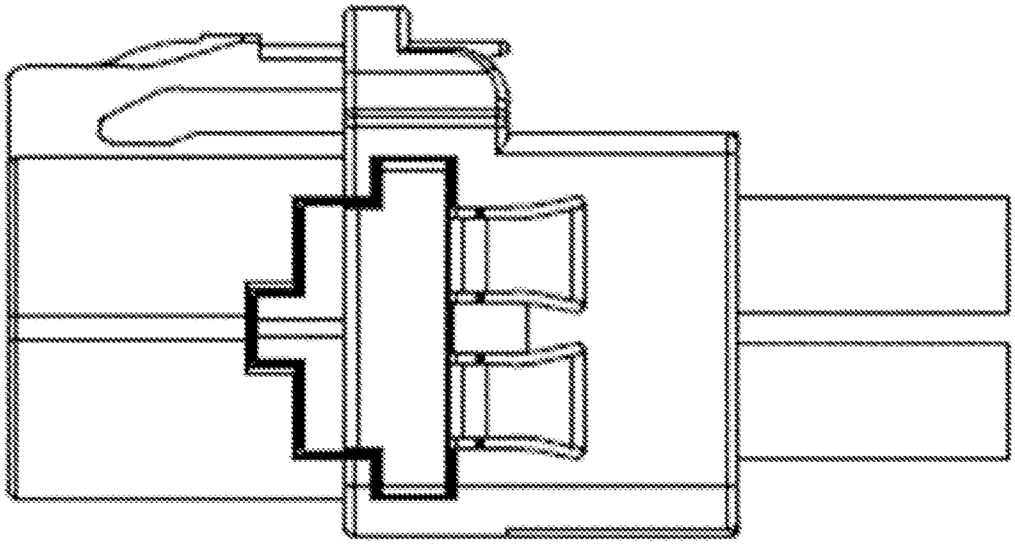
FIG. 29 is a right side view of the electrical connector according to the first embodiment of the present disclosure and the coaxial cables attached to the electrical connector.

Further, for reference, six side views of the electrical connector 1 according to the first embodiment of the present disclosure and the coaxial cables 500 attached to the electrical connector 1 are shown in FIGS. 24 to 29. FIG. 24 is a top view of the electrical connector 1 according to the first embodiment of the present disclosure and the coaxial cables 500 attached to the electrical connector 1. FIG. 25 is a bottom view of the electrical connector 1 according to the first embodiment of the present disclosure and the coaxial cables 500 attached to the electrical connector 1. FIG. 26 is a front view of the electrical connector 1 according to the first embodiment of the present disclosure and the coaxial cables 500 attached to the electrical connector 1. FIG. 27 is a rear view of the electrical connector 1 according to the first embodiment of the present disclosure and the coaxial cables 500 attached to the electrical connector 1. FIG. 28 is a left side view the electrical connector 1 according to the first embodiment of the present disclosure and the coaxial cables 500 attached to the electrical connector 1. FIG. 29 is a right side view of the electrical connector 1 according to the first embodiment of the present disclosure and the coaxial cables 500 attached to the electrical connector 1.

Second Embodiment

Figure 30:
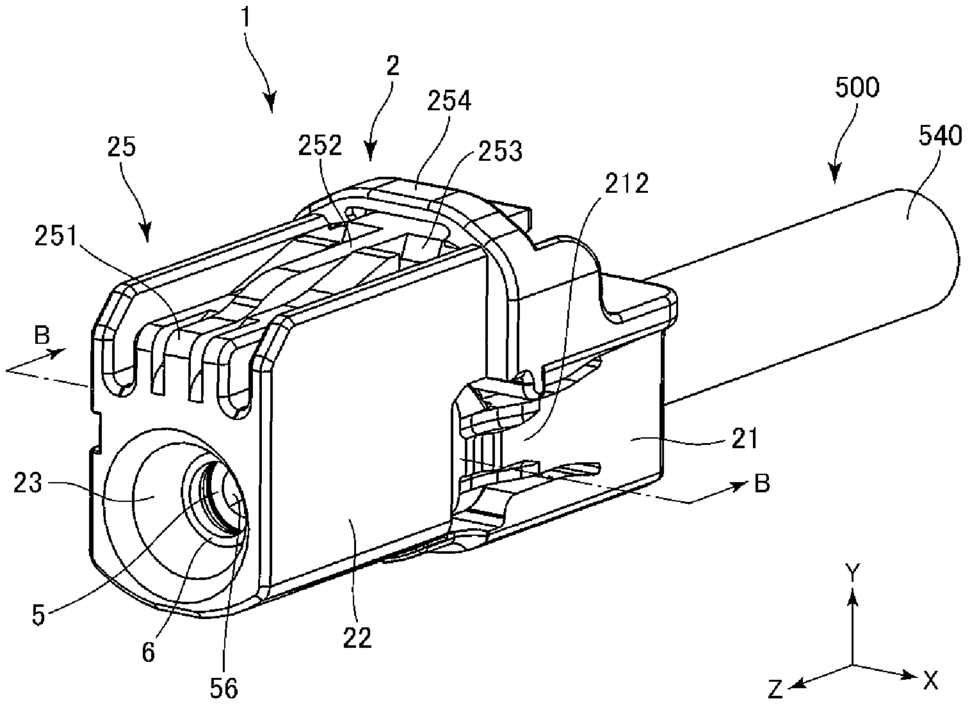
FIG. 30 is a perspective view of an electrical connector according to a second embodiment of the present disclosure and the coaxial cable.
Figure 31:
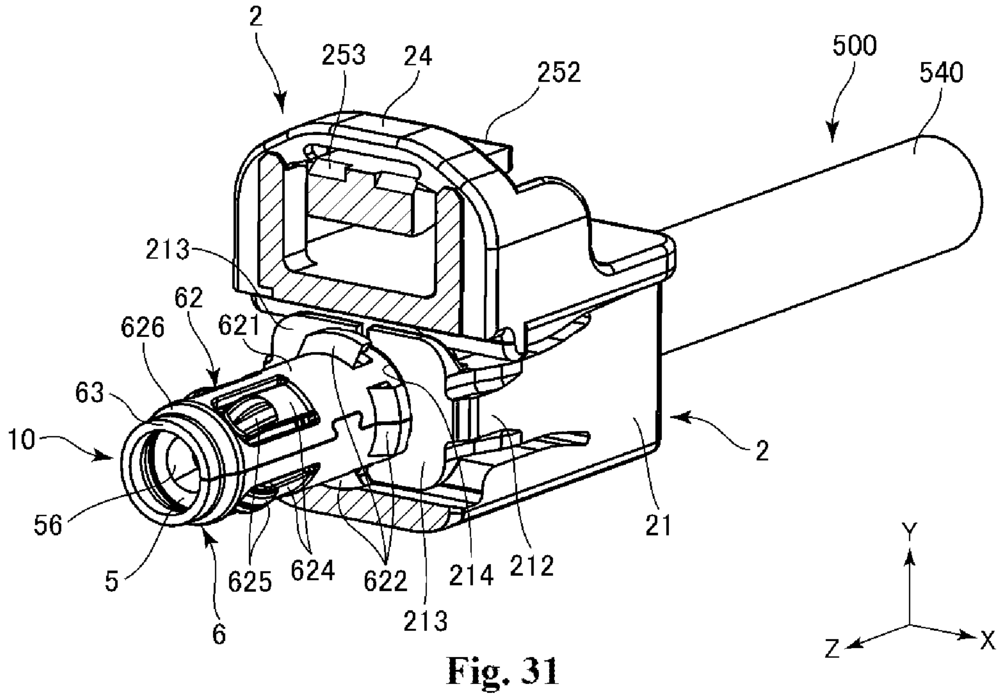
FIG. 31 is a perspective view of the electric connector and the coaxial cable.

Next, an electrical connector according to a second embodiment of the present disclosure will be described in detail with reference to FIGS. 30 and 31. FIG. 30 is a perspective view of the electrical connector according to the second embodiment of the present disclosure and the coaxial cable. FIG. 31 is a perspective view of the electrical connector and the coaxial cable. In FIG. 31, a part of the case located more to the tip side than a B-B line in shown 30 is omitted.

Hereinafter, the electrical connector of the second embodiment will be described by placing emphasis on the points differing from the electrical connector of the first embodiment with the same matters being omitted from the description. The electrical connector according to the second embodiment has the same configuration as the configuration of the electrical connector according to the first embodiment except that the number of coaxial cables to be attached is different and the method for holding the coaxial cable 500 to which the connector assembly 10 is attached in the cover 2 is different.

The electrical connector 1 of the present embodiment shown in FIG. 30 is a plug-type 1-pin connector for providing one coaxial connection with one coaxial cable 500. In the present embodiment, since the configuration of the connector assembly 10 to be attached to the one end portion of the coaxial cable 500 is the same as the configuration of the connector assembly 10 of the electrical connector 1 of the first embodiment, description for the configuration of the connector assembly 10 of the present embodiment will be omitted.

In the present embodiment, the pair of fixing members 3 are not used for fixing the coaxial cable 500 to which the connector assembly 10 is attached in the cover 2 and preventing the coaxial cable 500 to which the connector assembly 10 is attached from being removed from the cover 2 as shown in FIG. 30. Instead of using the pair of fixing members 3, the configurations of the pair of engagement portions 212 of the cover 2 are modified in the present disclosure.

FIG. 31 shows perspective view of the electrical connector 1 and the coaxial cable 500. In FIG. 31, a part of the cover 2 located more to the tip side (the +Z direction side) than a B-B line shown in FIG. 30 is omitted in order to show tip end portions of the pair of engagement portions 212 of the cover 2. As shown in FIG. 31, a receiving portion 213 extending toward the inner side of the cover 2 is formed at each of the tip end portions of the pair of engagement portions 212. A tip end surface of the receiving portion 213 is a flat surface perpendicular to the insertion and extraction direction of the electrical connector 1 (the Z direction). Further, the pair of receiving portions 213 form an opening 214 through which the body portion 621 of the housing containing portion 62 of the outer contact 6 is passed. The opening 214 is a circular opening having a diameter substantially equal to the outer diameter of the body portion 621.

When the coaxial cable 500 to which the connector assembly 10 is attached is inserted into the insertion hole 23 of the cover 2 of the present embodiment from the base side, the body portion 621 of the housing containing portion 62 of the outer contact 6 is press-fitted into the opening 214 of the cover 2. Further, the base end surfaces of the four engagement portions 622 extending from the body portion 621 toward the outer side are engaged with the tip end surfaces of the pair of receiving portions 213. With this configuration, it is possible to fix the coaxial cable 500 to which the connector assembly 10 is attached in the cover 2 and prevent the coaxial cable 500 to which the connector assembly 10 is attached from being removed from the cover 2.

Figure 32:
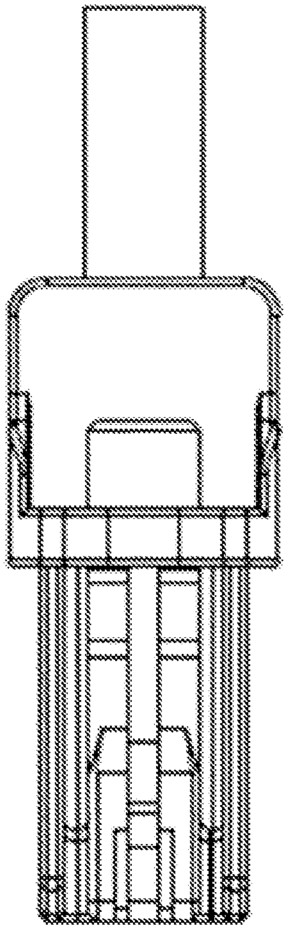
FIG. 32 is a top view of the electrical connector according to the second embodiment of the present disclosure and the coaxial cable attached to the electrical connector.
Figure 33:
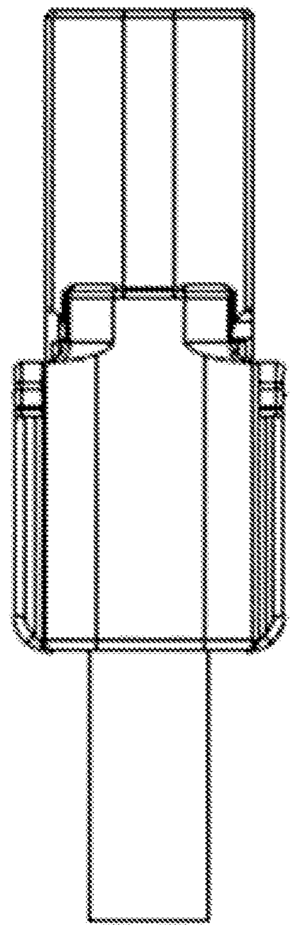
FIG. 33 is a bottom view of the electrical connector according to the second embodiment of the present disclosure and the coaxial cable attached to the electrical connector.
Figure 34:
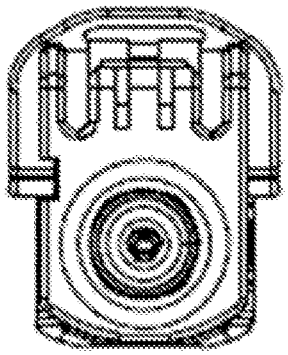
FIG. 34 is a front view of the electrical connector according to the second embodiment of the present disclosure and the coaxial cable attached to the electrical connector.
Figure 35:
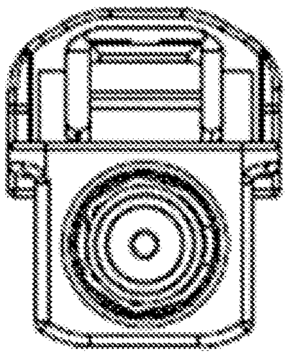
FIG. 35 is a rear view of the electrical connector according to the second embodiment of the present disclosure and the coaxial cable attached to the electrical connector.
Figure 36:
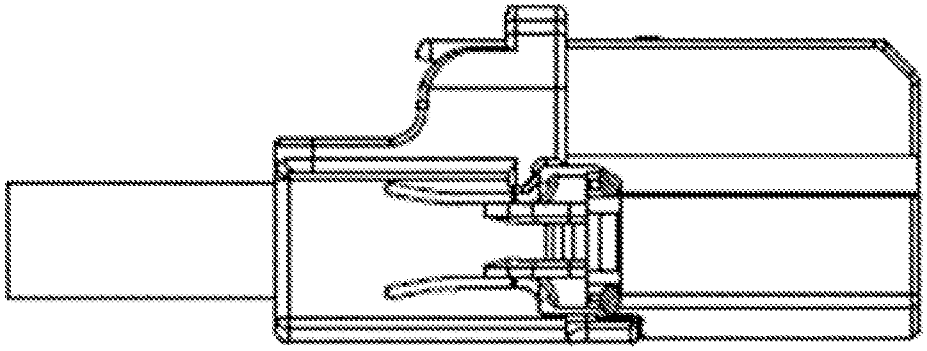
FIG. 36 is a left side view of the electrical connector according to the second embodiment of the present disclosure and the coaxial cable attached to the electrical connector.
Figure 37:
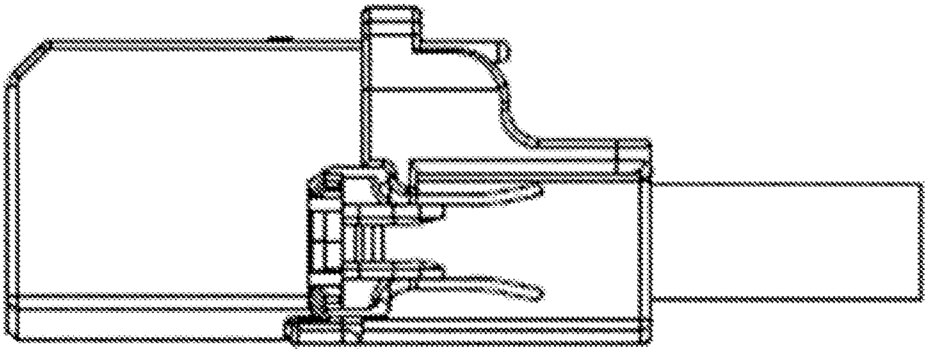
FIG. 37 is a right side view of the electrical connector according to the second embodiment of the present disclosure and the coaxial cable attached to the electrical connector.

Further, for reference, six side views of the electrical connector 1 according to the second embodiment of the present disclosure and the coaxial cable 500 attached to the electrical connector 1 are shown in FIGS. 32 to 37. FIG. 32 is a top view of the electrical connector 1 according to the second embodiment of the present disclosure and the coaxial cable 500 attached to the electrical connector 1. FIG. 33 is a bottom view of the electrical connector 1 according to the second embodiment of the present disclosure and the coaxial cable 500 attached to the electrical connector 1. FIG. 34 is a front view of the electrical connector 1 according to the second embodiment of the present disclosure and the coaxial cable 500 attached to the electrical connector 1. FIG. 35 is a rear view the electrical connector 1 according to the second embodiment of the present disclosure and the coaxial cable 500 attached to the electrical connector 1. FIG. 36 is a left side view of the electrical connector 1 according to the second embodiment of the present disclosure and the coaxial cable 500 attached to the electrical connector 1. FIG. 37 is a right side view of the electrical connector 1 according to the second embodiment of the present disclosure and the coaxial cable 500 attached to the electrical connector 1.

Although the electrical connector according to each embodiment of the present disclosure has been described with reference to the illustrated aspects, the present disclosure is not limited thereto. Each configuration of the present disclosure can be replaced with an arbitrary configuration capable of performing the same function, or an arbitrary configuration can be added to each configuration of the present disclosure.

A person having ordinary skills in the art and the technique pertaining to the present disclosure may modify the configuration of the electrical connector of the present disclosure described above without meaningfully departing from the principle, the spirit and the scope of the present disclosure and the electrical connector having the modified configuration is also involved in the scope of the present disclosure.

In addition, the number and types of the components of the electrical connector shown in the drawings are merely illustrative examples and the present disclosure is not necessarily limited thereto. An aspect in which any component is added or combined or any component is omitted without departing from the principle and intent of the present disclosure is also involved within the scope of the present disclosure.

The invention claimed is:

1. An electrical connector to be coupled with a coaxial cable including a core wire, an inner insulator layer covering the core wire, an outer conductor layer covering the inner insulator layer and an outer insulator layer covering the outer conductor layer, the electrical connector comprising:
- a contact pin to be connected to the core wire of the coaxial cable;
- an insulating housing for holding the contact pin therein;
- a cylindrical outer contact for covering the insulating housing; and
- a crimping member for attaching the outer contact to the coaxial cable,
- wherein a base end portion of the outer contact is located between the inner insulator layer and the outer conductor layer of the coaxial cable,
- wherein the outer contact is attached to the coaxial cable by crimping the crimping member onto the outer conductor layer of the coaxial cable located on the base end portion of the outer contact,
- wherein the crimping member includes a first crimping portion to be crimped onto the outer conductor layer of the coaxial cable so as to surround an outer peripheral surface of the outer conductor layer of the coaxial cable,
- wherein the first crimping portion of the crimping member includes:
  - a pair of plate-like portions closed by connecting one end portions of the pair of plate-like portions to each other so as to surround the outer conductor layer of the coaxial cable,
  - an engagement concave portion formed on one of the pair of plate-like portions, and
  - an engagement convex portion formed on another one of the pair of plate-like portions,
- wherein the engagement concave portion formed on the one of the pair of plate-like portions is engaged with the engagement convex portion formed on the other one of the pair of plate-like portions to prevent the pair of plate-like portions from being opened,
- wherein the engagement concave portion has a shape whose width gradually increases as it is separated from another end portion of the plate-like portion, and
- wherein the engagement convex portion has a shape whose width gradually decreases as it is separated from another end portion of the plate-like portion so as to correspond to the shape of the engagement concave portion.

2. The electrical connector as claimed in claim 1, wherein the crimping member is crimped onto the outer conductor layer of the coaxial cable so as to surround the outer conductor layer of the coaxial cable, and
- wherein the outer conductor layer of the coaxial cable is clamped between the crimping member and the outer contact, thereby attaching the outer contact to the coaxial cable.

3. The electrical connector as claimed in claim 1, wherein the crimping member includes a second crimping portion to be crimped onto the outer insulator layer of the coaxial cable so as to surround an outer peripheral surface of the outer insulator layer of the coaxial cable, and
- wherein the first crimping portion and the second crimping portion of the crimping member are connected to each other.

4. The electrical connector as claimed in claim 1, further comprising an insulating ring member located between the base end portion of the outer contact and the inner insulator layer of the coaxial cable,
- wherein the ring member is contained in the outer contact, and
- wherein the outer contact completely covers the insulating ring member from a tip end portion to a base end portion of the insulating ring member.

5. The electrical connector as claimed in claim 4, wherein the insulating housing has a cylindrical shape, and
- wherein the insulating housing and the ring member are concentrically held in the outer contact.

6. The electrical connector as claimed in claim 4, wherein the base end portion includes a cylindrical body portion,
- wherein the ring member includes at least three protruding pieces protruding from an outer peripheral surface of the ring member toward the outer side, and
- wherein a base end portions of the at least three protruding pieces are engaged with an inner peripheral surface of the cylindrical body portion, thereby fixing the ring member in the cylindrical body portion.

7. The electrical connector as claimed in claim 1, wherein the outer contact further includes a housing containing portion extending from a tip end portion of the base end portion toward the tip side,
- wherein the housing containing portion has a cylindrical body portion and at least three engagement portions protruding from an outer peripheral surface of the cylindrical body portion toward the outer side.

8. The electrical connector as claimed in claim 7, wherein the electrical connector further includes a cover for holding the outer contact,
- wherein the cover includes a pair of engagement portions which are respectively engaged with two engagement portions of the at least three engagement portions of the outer contacts, thereby preventing the outer contact from being removed from the cover.

9. The electrical connector as claimed in claim 1, wherein the contact pin includes a holding portion for holding the core wire of the coaxial cable therein and a cylindrical portion extending from a tip end portion of the holding portion toward the tip side, the cylindrical portion includes a pair of spring portions protruding from the cylindrical portion toward the outer side, and each of the pair of spring portions is configured to be elastically deformed toward the inner side.

10. The electrical connector as claimed in claim 9, wherein the housing includes:

a base end portion, a positioning portion extending from the base end portion toward the tip side, a small outer diameter portion extending from the positioning portion toward the tip side, a pair of engagement holes formed across the positioning portion and the small outer diameter portion, and an insertion hole through which the housing should be passed in the insertion and extraction direction of the electrical connector, and wherein when the contact pin is press-fitted into the insertion hole of the housing, the pair of spring portions of the contact pin are respectively engaged with the pair of engagement holes of the housing, thereby preventing the contact pin from being removed from the housing.

11. An electrical connector to be coupled with a coaxial cable including a core wire, an inner insulator layer covering the core wire, an outer conductor layer covering the inner insulator layer and an outer insulator layer covering the outer conductor layer, the electrical connector comprising:

a contact pin to be connected to the core wire of the coaxial cable;

an insulating housing for holding the contact pin therein;

a cylindrical outer contact for covering the insulating housing; and a crimping member for attaching the outer contact to the coaxial cable, wherein a base end portion of the outer contact is located between the inner insulator layer and the outer conductor layer of the coaxial cable, wherein the outer contact is attached to the coaxial cable by crimping the crimping member onto the outer conductor layer of the coaxial cable located on the base end portion of the outer contact, wherein the electrical connector further comprises an insulating ring member located between the base end portion of the outer contact and the inner insulator layer of the coaxial cable, wherein the ring member is contained in the outer contact, and wherein the outer contact completely covers the insulating ring member from a tip end portion to a base end portion of the insulating ring member.

12. The electrical connector as claimed in claim 11, wherein the insulating housing has a cylindrical shape, and wherein the insulating housing and the ring member are concentrically held in the outer contact.

13. The electrical connector as claimed in claim 11, wherein the base end portion includes a cylindrical body portion, wherein the ring member includes at least three protruding pieces protruding from an outer peripheral surface of the ring member toward the outer side, and wherein a base end portions of the at least three protruding pieces are engaged with an inner peripheral surface of the cylindrical body portion, thereby fixing the ring member in the cylindrical body portion.

* * * * *